US012762386B2

(12) United States Patent
Meng

(10) Patent No.: US 12,762,386 B2
(45) Date of Patent: Oct. 13, 2026

(54) ARTIFICIAL INTELLIGENCE ACCELERATOR, ARTIFICIAL INTELLIGENCE ACCELERATION DEVICE, ARTIFICIAL INTELLIGENCE ACCELERATION CHIP, AND DATA PROCESSING METHOD

(71) Applicant: TENCENT TECHNOLOGY (SHENZHEN) COMPANY LTD, Shenzhen (CN)

(72) Inventor: Yu Meng, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 1145 days.

(21) Appl. No.: 17/513,298

(22) Filed: Oct. 28, 2021

(65) Prior Publication Data

US 2022/0051088 A1 Feb. 17, 2022

Related U.S. Application Data

(63) Continuation of application No. PCT/CN2020/118809, filed on Sep. 29, 2020.

(30) Foreign Application Priority Data

Dec. 4, 2019 (CN) ......................... 201911237525.6

(51) Int. Cl.
*G06N 3/063* (2023.01)
*G06F 9/48* (2006.01)
*G06F 9/50* (2006.01)

(52) U.S. Cl.
CPC ........... *G06N 3/063* (2013.01); *G06F 9/4806* (2013.01); *G06F 9/5027* (2013.01)

(58) Field of Classification Search
CPC ........ G06N 3/063; G06N 3/044; G06N 3/045; G06F 9/4806; G06F 9/5027
See application file for complete search history.

(56) References Cited

U.S. PATENT DOCUMENTS 9,836,691 B1 * 12/2017 Narayanaswami .. G06N 3/0464
11,170,463 B2 * 11/2021 Boyd .................... G06F 9/4806
(Continued)

FOREIGN PATENT DOCUMENTS

CN 107657581 A 2/2018
CN 108805272 A * 11/2018 ............ G06N 3/063
CN 110991634 A 4/2020

OTHER PUBLICATIONS

Qiu, Jiantao, et al. "Going deeper with embedded FPGA platform for convolutional neural network." Proceedings of the 2016 ACM/SIGDA international symposium on field-programmable gate arrays. 2016. (Year: 2016).*

(Continued)

*Primary Examiner* — Michael J Huntley
*Assistant Examiner* — Jasmine Thanh Thai
(74) *Attorney, Agent, or Firm* — Sughrue Mion, PLLC

(57) ABSTRACT

An artificial intelligence accelerator, a device, a chip, and a data processing method are provided. The artificial intelligence accelerator has a capability to respectively process data with a depth of a second quantity in parallel by using a first quantity of operation functions, and includes a control unit, a computing engine, a group control unit, and a group cache unit. The control unit is configured to parse a processing instruction for a target network layer in a neural network model to obtain a concurrent instruction, the computing engine is configured to perform parallel processing on a target input tile in the input data set according to the concurrent instruction to obtain target output data corresponding to the target input tile, and the group control unit (Continued)

is configured to store, by group, the target output data into at least one output cache of the group cache unit.

20 Claims, 12 Drawing Sheets

(56) References Cited

U.S. PATENT DOCUMENTS

| | | | | |
|---|---|---|---|---|
| 11,270,197 | B2 * | 3/2022 | Shao | G06N 3/045 |
| 11,467,969 | B2 * | 10/2022 | Nagy | G06F 12/0846 |
| 11,494,608 | B2 * | 11/2022 | Fais | G06N 3/045 |
| 11,562,205 | B2 * | 1/2023 | Wang | G06N 3/045 |
| 2015/0032962 | A1 * | 1/2015 | Buyuktosunoglu | G06F 12/0811 711/122 |
| 2016/0062947 | A1 * | 3/2016 | Chetlur | G06F 17/153 708/420 |
| 2016/0335082 | A1 * | 11/2016 | Sadeh | G06F 9/30036 |
| 2016/0350645 | A1 * | 12/2016 | Brothers | G06T 1/60 |
| 2017/0357891 | A1 * | 12/2017 | Judd | G06N 3/049 |
| 2018/0046903 | A1 * | 2/2018 | Yao | G06N 3/048 |
| 2018/0285726 | A1 * | 10/2018 | Baum | G06N 3/02 |
| 2018/0285727 | A1 * | 10/2018 | Baum | G06F 5/01 |
| 2018/0307624 | A1 * | 10/2018 | Zmora | G06N 3/084 |
| 2018/0314671 | A1 * | 11/2018 | Zhang | G06F 15/8092 |
| 2018/0314926 | A1 * | 11/2018 | Schwartz | G06N 3/084 |
| 2018/0365553 | A1 * | 12/2018 | Nowatzyk | G06N 3/045 |
| 2019/0042925 | A1 * | 2/2019 | Choe | G06N 3/063 |
| 2019/0050717 | A1 * | 2/2019 | Temam | G06N 3/048 |
| 2019/0065937 | A1 * | 2/2019 | Nowatzyk | G01R 31/31718 |
| 2019/0073585 | A1 * | 3/2019 | Pu | G11C 11/54 |
| 2019/0102860 | A1 * | 4/2019 | Koker | G06F 12/0811 |
| 2019/0205737 | A1 | 7/2019 | Bleiweiss et al. | |
| 2019/0213005 | A1 * | 7/2019 | Temam | G06N 3/045 |
| 2019/0220742 | A1 * | 7/2019 | Kuo | G06N 3/08 |

OTHER PUBLICATIONS

Shafiee, Ali, et al. "ISAAC: A convolutional neural network accelerator with in-situ analog arithmetic in crossbars." ACM SIGARCH Computer Architecture News 44.3 (2016): 14-26. (Year: 2016).*

M. Mao, X. Sun, X. Peng, S. Yu and C. Chakrabarti, "A Versatile ReRAM-based Accelerator for Convolutional Neural Networks," 2018 IEEE International Workshop on Signal Processing Systems (SiPS), Cape Town, South Africa, 2018, pp. 211-216, doi: 10.1109/SiPS.2018.8598372. (Year: 2018).*

Lu, Hang, et al. "Tetris: Re-architecting convolutional neural network computation for machine learning accelerators." 2018 IEEE/ACM International Conference on Computer-Aided Design (ICCAD). IEEE, 2018. (Year: 2018).*

S. Kala, B. R. Jose, J. Mathew and S. Nalesh, "High-Performance CNN Accelerator on FPGA Using Unified Winograd-GEMM Architecture," in IEEE Transactions on Very Large Scale Integration (VLSI) Systems, vol. 27, No. 12, pp. 2816-2828, Dec. 2019, doi: 10.1109/TVLSI.2019.2941250 (Year: 2019).*

International Search Report for PCT/CN2020/118809 dated Dec. 31, 2020 [PCT/ISA/210].

Written Opinion for PCT/CN2020/118809 dated Dec. 31, 2020 [PCT/ISA/237].

* cited by examiner

ARTIFICIAL INTELLIGENCE ACCELERATOR, ARTIFICIAL INTELLIGENCE ACCELERATION DEVICE, ARTIFICIAL INTELLIGENCE ACCELERATION CHIP, AND DATA PROCESSING METHOD

CROSS-REFERENCE TO RELATED APPLICATION(S)

This application is a continuation application of International Application No. PCT/CN2020/118809, filed Sep. 29, 2020, which claims priority to Chinese Patent Application No. 201911237525.6, filed with the China National Intellectual Property Administration on Dec. 4, 2019, the disclosures of which are incorporated by reference in their entireties.

FIELD

The disclosure relates to the field of Internet technologies, and more specifically, to the field of artificial intelligence technologies, and in particular, to an artificial intelligence accelerator, an artificial intelligence acceleration device, an artificial intelligence acceleration chip, and a data processing method.

BACKGROUND

With the development of science and technology, neural network models have been successfully applied to various fields such as image recognition processing and automatic driving. However, with increasing application requirements, there are more and more network layers in a neural network model. An increase in network layers leads to an increasing model depth of the neural network model. As a result, a computing amount of the neural network model significantly increases, and processing efficiency of the neural network model is relatively low. In addition, for some application scenarios with relatively high image precision requirements (for example, a medical image recognition scenario and a high-definition video recognition scenario), a size of input data of a neural network model typically reaches 2k*2k, or even 5k*5k. Relatively large input data further increases computing pressure of the neural network model. Therefore, how to perform acceleration processing on the neural network model becomes an important research topic.

SUMMARY

Embodiments of the disclosure provide an artificial intelligence accelerator, an artificial intelligence acceleration device, an artificial intelligence acceleration chip, and a data processing method, which may effectively accelerate a processing procedure of a neural network model, and properly improve an acceleration effect of the neural network model.

According to an aspect of an example embodiment of the disclosure, provided is an artificial intelligence accelerator having a capability to respectively process, by using a first quantity of operation functions, data with a depth of a second quantity in parallel; the artificial intelligence accelerator comprising a control unit, a computing engine, a group control unit, and a group cache unit; and the group cache unit being provided with output caches having the first quantity;

the control unit being configured to parse a processing instruction for a target network layer in a neural network model to obtain a concurrent instruction, an input data set of the target network layer including a plurality of input tiles, and a depth of the input tile being obtained by performing adaptation processing according to the second acceleration parallelism degree;

the computing engine being configured to perform parallel processing on a target input tile in the input data set according to the concurrent instruction to obtain target output data corresponding to the target input tile; and the group control unit being configured to store, by group, the target output data into at least one output cache of the group cache unit.

According to an aspect of an example embodiment of the disclosure, provided is a data processing method, performed by performed by an artificial intelligence accelerator having a capability to respectively process, by using a first quantity of operation functions, data with a depth of a second quantity in parallel, the artificial intelligence accelerator comprising a group cache unit, which is provided with output caches having the first quantity, the data processing method including:

parsing a processing instruction for a target network layer in a neural network model to obtain a concurrent instruction, an input data set of the target network layer including a plurality of input tiles, and a depth of the input tile being obtained by performing adaptation processing according to the second acceleration parallelism degree;

performing parallel processing on a target input tile in the input data set according to the concurrent instruction to obtain target output data corresponding to the target input tile; and storing, by group, the target output data into at least one output cache.

According to an aspect of an example embodiment of the disclosure, provided is an artificial intelligence acceleration device, including the foregoing artificial intelligence accelerator.

According to an aspect of an example embodiment of the disclosure, provided is an artificial intelligence acceleration chip, packaged with the foregoing artificial intelligence accelerator.

BRIEF DESCRIPTION OF THE DRAWINGS

To describe the technical solutions in the example embodiments of the disclosure more clearly, the following briefly introduces the accompanying drawings for describing the embodiments. The accompanying drawings in the following description show only some embodiments of the disclosure, and a person of ordinary skill in the art may still derive other drawings from these accompanying drawings without creative efforts.

DETAILED DESCRIPTION

Figure 1A:
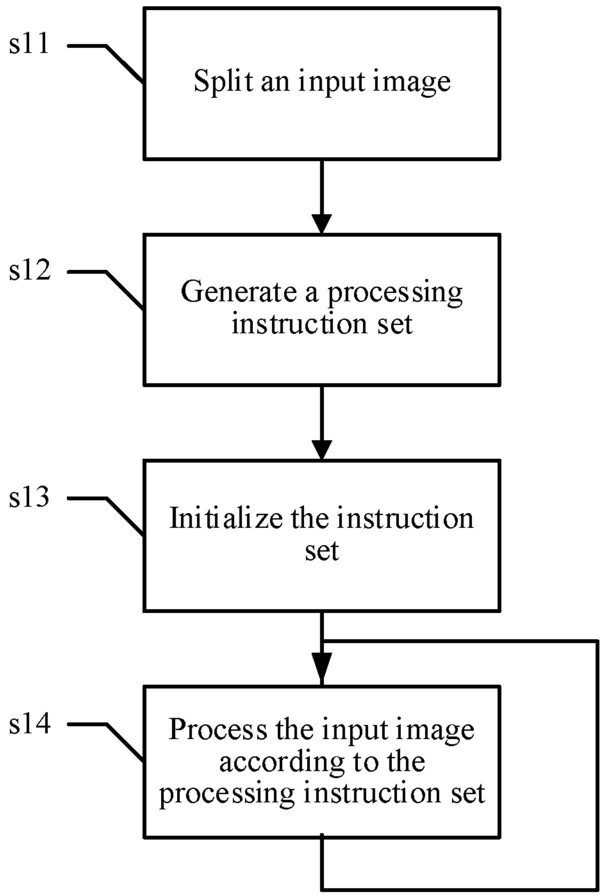
FIG. 1A is a schematic working flowchart of an artificial intelligence accelerator according to an embodiment of the disclosure.

The following clearly and completely describes technical solutions in embodiments of the disclosure with reference to the accompanying drawings in the embodiments of the disclosure.

Artificial Intelligence (AI) is a theory, method, technology, and application system that uses a digital computer or a machine controlled by the digital computer to simulate, extend, and expand human intelligence, perceive an environment, acquire knowledge, and use knowledge to obtain an optimal result. In other words, the AI is a comprehensive technology of computer science, which attempts to understand essence of intelligence and produces a new intelligent machine that may respond in a manner similar to human intelligence. The AI is to study the design principles and implementation methods of various intelligent machines, to enable the machines to have the functions of perception, reasoning, and decision-making. The AI technology is a comprehensive subject and covers a wide range of fields. The AI technology includes both software-level and hardware-level technologies. The AI software level mainly relates to a related technology of a neural network model. The neural network model herein refers to a model obtained by simulating a human actual neural network. The neural network model may be a convolutional neural network model (CNN), a recurrent neural network model (RNN), or the like. Unless otherwise specified, the neural network model mentioned below is described by using the CNN as an example. The neural network model may include a plurality of network layers, and each network layer has its own operation parallelism degree. The so-called parallelism degree refers to a maximum quantity of data or operation functions executed in parallel. The operation function herein refers to a function that is of a network layer of the neural network model and that is used for processing data, for example, a convolution kernel function, a pooling function, and an accumulation function. The AI hardware level mainly relates to a related technology of an artificial intelligence accelerator. The artificial intelligence accelerator is an apparatus that accelerates a processing procedure of the neural network model by using the parallelism degree of the neural network model.

An embodiment of the disclosure provides an artificial intelligence accelerator with high efficiency and low power consumption. The artificial intelligence accelerator may be executed on a hardware platform such as a field programmable gate array (FPGA) and an application specific integrated circuit (ASIC). In some embodiments, a processing chip is disposed in the artificial intelligence accelerator, and the processing chip may be configured to improve overall performance of the artificial intelligence accelerator, reduce power consumption, and improve an acceleration effect of a neural network model. The artificial intelligence accelerator may be applied to acceleration scenarios of various neural network models. For example, the artificial intelligence accelerator may be applied to an acceleration scenario of a neural network model in which a large image is used as input data, or may be applied to an acceleration scenario of a neural network model in which a small image is used as input data. The large image herein refers to an image whose internal memory occupation is greater than that of an on-chip cache of the processing chip, such as a medical image, a high-definition game image, and a video frame image of a high-definition video. The small image refers to an image whose internal memory occupation is less than or equal to that of the on-chip cache of the processing chip. The following describes, by using an example in which an input image is a large image, the artificial intelligence accelerator provided in this embodiment of the disclosure in terms of a working procedure and a specific structure.

(1) Working Procedure

Figure 1B:
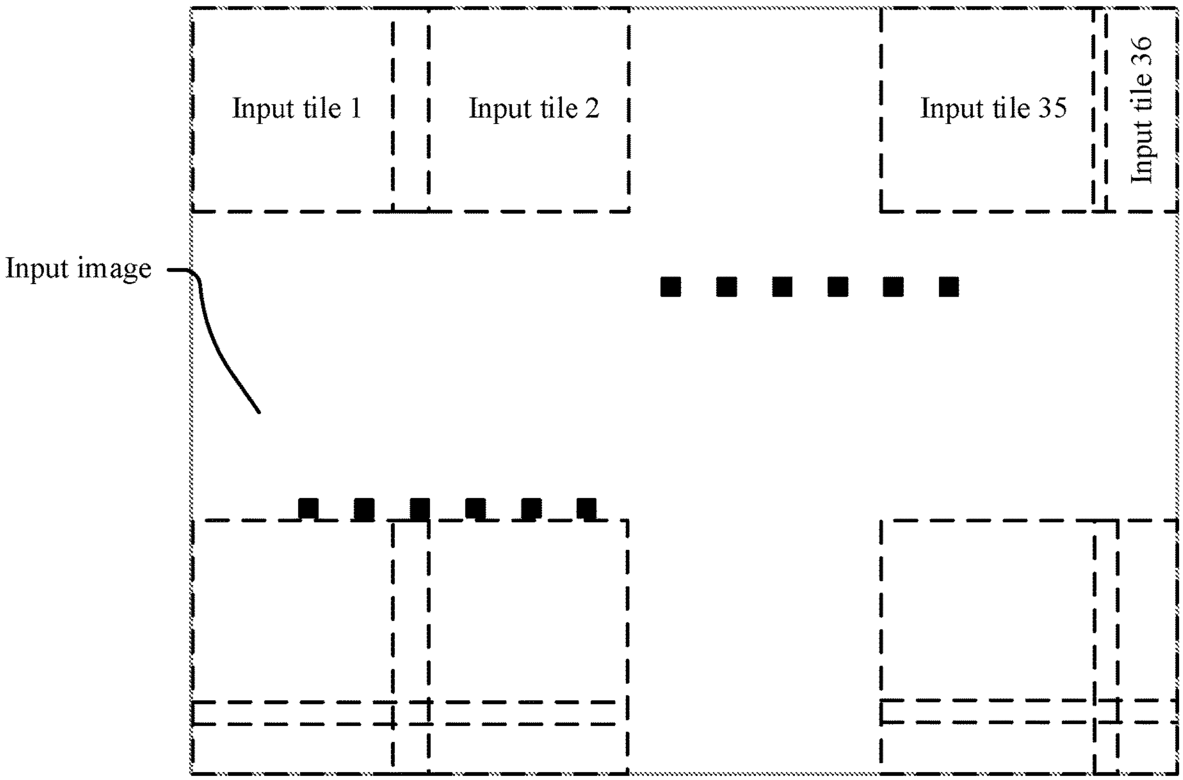
FIG. 1B is a schematic diagram of image splitting according to an embodiment of the disclosure.

Referring to FIG. 1A, a working procedure of the artificial intelligence accelerator provided in this embodiment of the disclosure may mainly include the following operations S11-S14:

S11. Split an input image. In this embodiment of the disclosure, to better improve an acceleration effect of a neural network model, a process of splitting the input image may be used as an offline process. The input image of the neural network model may be split, by performing operation S11, into a plurality of input tiles suitable for a processing chip to process. For ease of understanding, FIG. 1B shows a schematic diagram of an example image splitting. In some embodiments, the input image may be split according to a size of an on-chip cache of the processing chip and an acceleration parallelism degree of the artificial intelligence accelerator, to obtain a plurality of tiles shown in FIG. 1B. Compared with that of the input image, a size of the tile after splitting becomes smaller, so that a data amount before and after an operation may be placed inside the processing chip. Therefore, in subsequent processing, all tiles may be successively transmitted to the processing chip in the artificial intelligence accelerator for computing, so as to complete arrangement of an initial pipeline.

S12. Generate a processing instruction set. The processing instruction set may include processing instructions for all network layers in the neural network model. A processing instruction for any network layer may include but is not limited to a data adaptation instruction, a concurrent instruction, and a migration instruction. The data adaptation instruction instructs to adapt input data at any network layer to an input tile that matches the size of the on-chip cache of the processing chip. The concurrent instruction instructs to perform parallel processing on the input tile. The migration instruction instructs to perform a data migration operation between the on-chip cache of the processing chip and an off-chip storage medium. Once the neural network model is fixed, a processing capability of each network layer (such as an operation parallelism degree, a quantity of operation functions, and a size of an input tile) inside the neural network model is fixed accordingly. Therefore, a process of generating the processing instruction set in operation S12 may also be used as an offline process, that is, the processing instructions for all the network layers may be pre-generated according to the neural network model. For a network layer with a high parallelism degree, a processing instruction corresponding to the network layer may implement parallel computing processing on another input tile while performing a migration operation on one input tile, thereby reducing wait time caused by the data migration operation to data computing. For a network layer with a low parallelism degree, a processing instruction corresponding to the network layer may combine output data corresponding to a plurality of input tiles, and then perform a migration operation on combined output data. In this way, a quantity of migration times is reduced, thereby reducing power consumption. Similar to the network layer, the artificial intelligence accelerator also has an acceleration parallelism degree. Correspondingly, the network layer with a high parallelism degree refers to a network layer whose operation parallelism degree is greater than the acceleration parallelism degree of the artificial intelligence accelerator. The network layer with a low parallelism degree refers to a network layer whose operation parallelism degree is less than the acceleration parallelism degree of the artificial intelligence accelerator.

S13. Initialize the processing instruction set. The initializing the processing instruction set herein refers to an operation of storing the processing instructions for all the network layers generated by performing operation S12. In some embodiments, if an internal memory occupied by the processing instruction for each network layer is relatively small, the processing instruction for each network layer may be directly stored in the on-chip cache of the processing chip. If the internal memory occupied by the processing instruction for each network layer is large, the processing instruction for each network layer may be stored in the off-chip storage medium. For a specified neural network model, once processing instructions for all network layers inside the neural network model are prepared, the processing instructions do not need to be modified again during execution.

S14. Process the input image according to the processing instruction set. After the processing instructions for all the network layers are initialized, the input image may be input to the artificial intelligence accelerator according to a service request. The processing chip in the artificial intelligence accelerator successively performs corresponding operations according to the processing instructions for all the network layers that have been initialized in advance. In a process of processing the input image, input data at each network layer in the neural network processing model comes from output data of a previous network layer.

It may be learned from the foregoing operations S11-S14 that, in this embodiment of the disclosure, a large image may be split into different input tiles through flexible control over processing instructions, so as to implement flexible combination of output data corresponding to different input tiles in a network layer of a low parallelism degree, thereby reducing a quantity of data migration times and reducing power consumption during migration. A network layer with a relatively high parallelism degree is still compatible. The migration operation and computing may be performed in parallel by using the processing instruction, so as to reduce wait time of computing caused by the migration operation and improve overall performance.

(2) Specific Structure

The purpose of the artificial intelligence accelerator is to complete an operation of input data according to a processing instruction for each network layer in the neural network model. In this embodiment of the disclosure, one or more parallel computing engines (hereinafter referred to as a computing engine) are disposed in the processing chip of the artificial intelligence accelerator. The computing engine is a component that performs an operation in the artificial intelligence accelerator, and may be configured to perform parallel processing on input data at each network layer, so as to effectively accelerate a processing procedure of the neural network model. Parallel processing refers to processing a plurality of pieces of parallel data at a time. It may be learned from the foregoing that the neural network model generally involves a plurality of operations, such as a convolution operation, a pooling operation, an activation operation, and an accumulation operation. Correspondingly, the computing engines used for performing the operations in the artificial intelligence accelerator may include but are not limited to a convolution engine, a pooling engine, an activation engine, and the like. Because the convolution operation is the uppermost operation in the neural network model, for ease of description, the following is described by using an example that all subsequent operations refer to the convolution operation, and all computing engines refer to the convolution engine.

Figure 1C:
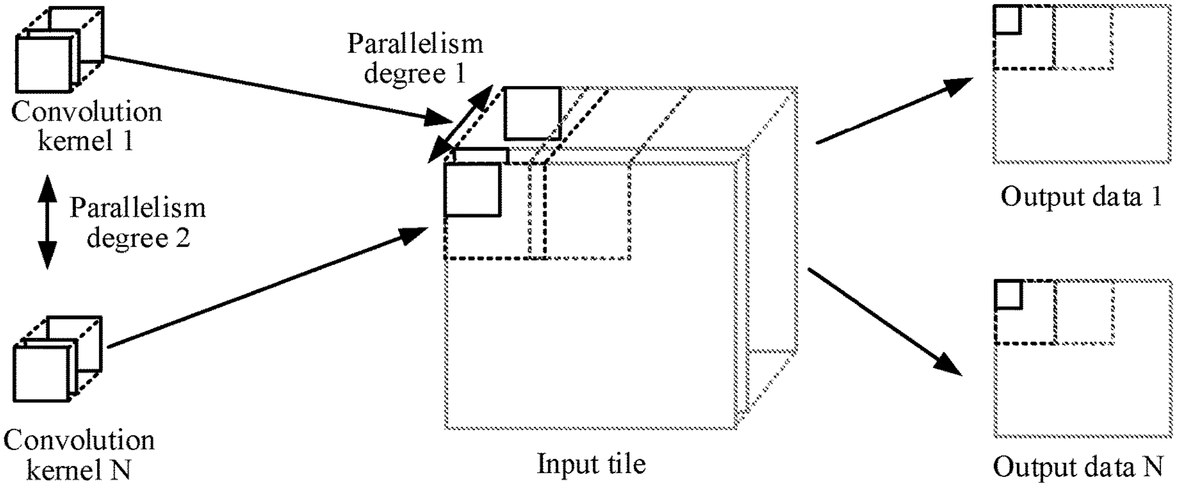
FIG. 1C is a schematic diagram of a convolution operation according to an embodiment of the disclosure.
Figure 1D:
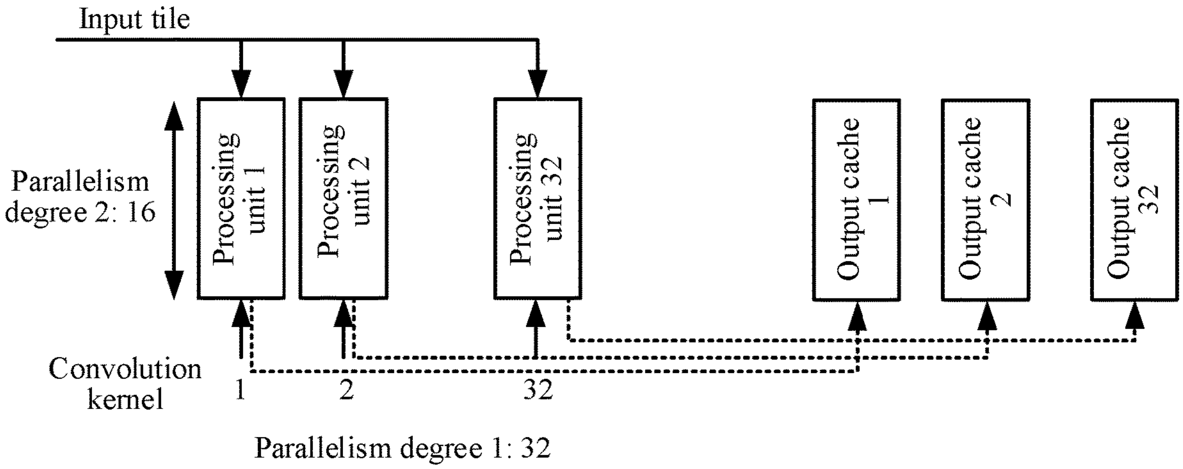
FIG. 1D is a correspondence between output of a computing engine and each output cache in a group cache unit according to an embodiment of the disclosure.

Referring to FIG. 1C, a process of performing a convolution operation by a computing engine in an embodiment may include: making a sliding window on input data (input feature map) by using N convolution kernels (operation function), and performing a multiply—accumulate operation on data located in the sliding window. From a perspective of parallel computing, the computing engine generally corresponds to two parallelism degrees: a parallelism degree 2 and a parallelism degree 1. The parallelism degree 2 refers to a processing data amount in each sliding window in a depth (channel) direction; the parallelism degree 1 refers to a quantity of convolution kernels used each time an operation is performed; values of the parallelism degree 2 and the parallelism degree 1 are in a large range, and may be up to 1024 or even larger, or may be down to 3 or 4 orders of magnitude. It can be learned that, the internal computing engine of the artificial intelligence accelerator completes a multiply—accumulate operation on a group of data. For example, if the parallelism degree of the computing engine is 16*32, it indicates that the parallelism degree 2 of the computing engine is 16 and the parallelism degree 1 of the computing engine is 32. That the parallelism degree 2 is 16 may indicate that each time parallel processing is performed, a processing data amount in the depth direction is 16 pieces of data. That is, in the depth direction, the input data may be adapted to a plurality of input tiles in an adaptation manner in which each 16 pieces of data are in one group, and the plurality of input tiles are successively transmitted to the computing engine for operation and accumulation. That the parallelism degree 1 is 32 may indicate that each time parallel processing is performed, 32 convolution kernels may be used simultaneously for performing parallel processing on input tiles. In some embodiments, the computing engine may include a plurality of processing elements (PEs), and a quantity of PEs is equal to the parallelism degree 1. One PE may be configured to process an input tile by using one convention kernel, and one PE corresponds to one output cache, as shown in FIG. 1D. Each time the computing engine performs parallel processing, a plurality of PEs may be invoked simultaneously, so that 32 convolution kernels are simultaneously used for performing parallel processing on the input tiles.

In this embodiment of the disclosure, the artificial intelligence accelerator has a first acceleration parallelism degree and a second acceleration parallelism degree. The first acceleration parallelism degree is used for indicating a quantity of operation functions used each time the artificial intelligence accelerator performs parallel processing. The second acceleration parallelism degree is used for indicating a processing data amount in the depth direction each time the artificial intelligence accelerator performs parallel processing. That is, the artificial intelligence accelerator has a capability to respectively process data with a depth of a second quantity (that is, a value of the second acceleration parallelism degree) in parallel by using a first quantity (that is, a value of the first acceleration parallelism degree) of operation functions. Herein, the acceleration parallelism degree of the artificial intelligence accelerator may be obtained by summing parallelism degrees of one or more computing engines that may simultaneously perform an operation in the artificial intelligence accelerator. For example, if two computing engines may perform parallel processing on data each time in the artificial intelligence accelerator, and a parallelism degree 2 of each of the two computing engines is 16, the second acceleration parallelism degree of the artificial intelligence accelerator is 16+16=32, that is, a processing data amount in the depth direction each time the artificial intelligence accelerator performs parallel processing is 32 pieces of data. Similarly, if a parallelism degree 1 of each of the two computing engines is 32, the first acceleration parallelism degree of the artificial intelligence accelerator is 32+32=64, that is, there are 64 operation functions used by the artificial intelligence accelerator each time performing parallel processing. For another example, if only one computing engine in the artificial intelligence accelerator performs parallel processing on data each time, and a parallelism degree of the computing engine is 16 (a parallelism degree 2)*32 (a parallelism degree 1), the acceleration parallelism degree of the artificial intelligence accelerator may be 16 (second acceleration parallelism degree) *32(first acceleration parallelism degree).

In this embodiment of the disclosure, a group cache unit is further disposed in the processing chip of the artificial intelligence accelerator. The group cache unit is provided with a plurality of output caches according to the first acceleration parallelism degree of the artificial intelligence accelerator. That is, a quantity of output caches is equal to the first acceleration parallelism degree of the artificial intelligence accelerator. For the first acceleration parallelism degree of the artificial intelligence accelerator, because all operation functions are in a parallel relationship in operation, output data of the operation functions may be stored into a plurality of output caches by group. For the second acceleration parallelism degree of the artificial intelligence accelerator, because the data in the depth direction is in an accumulative relationship in operation, the same output cache may be reused for output data obtained in the depth direction each time parallel processing is performed.

In addition, with increasing application requirements of the neural network model, new neural network models are continuously emerging, which causes a large difference in parallelism degrees between different neural network models, and there is a large difference in parallelism degrees between network layers of the same neural network model. For the same neural network model, some network layers may have a parallelism degree up to 1024 or more, and some network layers may have a parallelism degree down to 4 or 2. Based on this, in this embodiment of the disclosure, a group control unit is further disposed in the processing chip. The group control unit may be combined with the computing engine to resolve an unbalanced parallelism degree problem of different network layers, so that in a process of accelerating the neural network model by using the artificial intelligence accelerator, impact on overall performance and power consumption of the artificial intelligence accelerator due to the unbalanced parallelism degrees may be effectively reduced, and an acceleration effect of the neural network model is further improved. By disposing the group control unit at a relatively low cost, a group control capability of data may be added to the processing chip, so that the processing chip supports a flexible on-chip group read/write operation. For a network layer with a low parallelism degree, valid output data corresponding to a plurality of input tiles may be interleaved and combined, so as to reduce a quantity of subsequent migration times. For a network layer with a high parallelism degree, migration operations and operation processing may be performed on a plurality of input tiles in parallel, thereby reducing wait of computing for migration.

Figure 2:
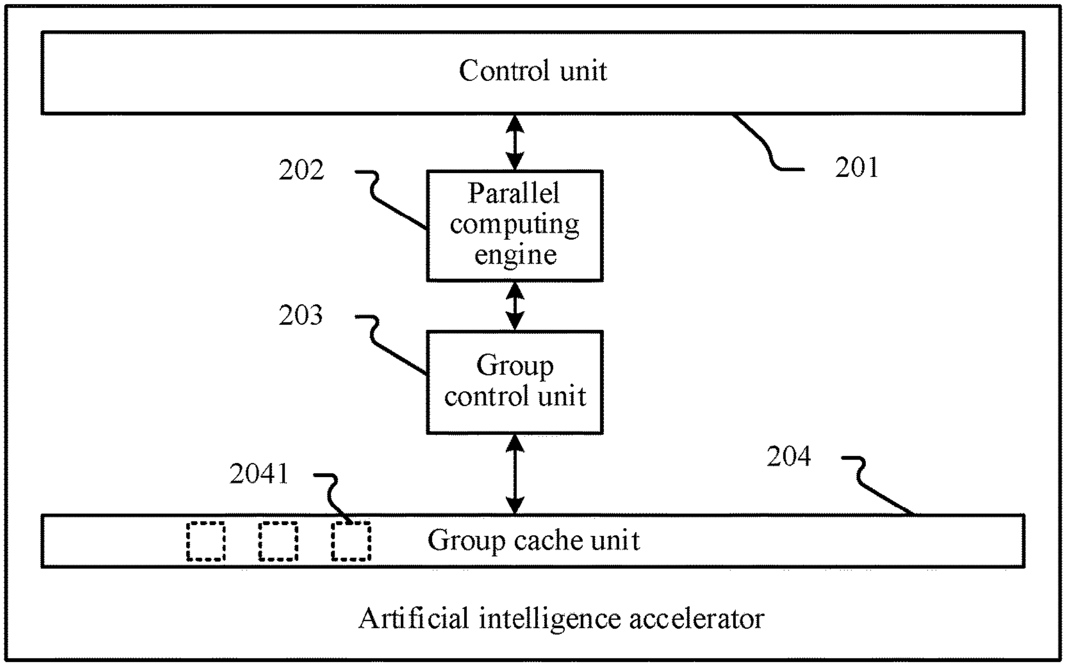
FIG. 2 is a schematic structural diagram of an artificial intelligence accelerator according to an embodiment of the disclosure.

FIG. 2 is an example of a structure of an artificial intelligence accelerator according to an embodiment of the disclosure. For ease of description, this embodiment of the disclosure uses one computing engine, that is, a first acceleration parallelism degree is equal to a parallelism degree 1 of the computing engine, and a second acceleration parallelism degree is equal to a parallelism degree 2 of the computing engine as an example for description. As shown in FIG. 2, the artificial intelligence accelerator may include a control unit 201, a computing engine 202, a group control unit 203, and a group cache unit 204. The group cache unit is provided with a plurality of output caches 2041 according to the first acceleration parallelism degree.

The control unit 201 is configured to parse a processing instruction for a target network layer in a neural network model to obtain a concurrent instruction. The target network layer is any network layer in the neural network model, an input data set of the target network layer including a plurality of input tiles, and a depth of the input tile is obtained by performing adaptation processing according to the second acceleration parallelism degree.

The computing engine 202 is configured to perform parallel processing on a target input tile in the input data set according to the concurrent instruction to obtain target output data corresponding to the target input tile, the target input tile being any input tile in the input data set.

The group control unit 203 is configured to store, by group, the target output data into at least one output cache 2041 of the group cache unit 204.

The control unit 201, the computing engine 202, the group control unit 203, and the group cache unit 204 may all be specifically disposed in a processing chip in the artificial intelligence accelerator.

The artificial intelligence accelerator in the embodiments of the disclosure has a first acceleration parallelism degree and a second acceleration parallelism degree; a group control unit and a group cache unit are disposed in the artificial intelligence accelerator, and a plurality of output caches are disposed in the group cache unit according to the first acceleration parallelism degree, so that the group control unit and the group cache unit have a grouping capability, and output data of each network layer in a neural network model may be flexibly controlled. When accelerating the neural network model, the artificial intelligence accelerator may first parse a processing instruction for a target network layer in the neural network model by using a control unit, so as to obtain a concurrent instruction. Second, a computing engine may perform parallel processing on a target input tile in the target network layer according to the concurrent instruction, so that a processing procedure of the neural network model may be effectively accelerated in a parallel processing manner. A depth of the target input tile is obtained through adaptation according to the second parallelism degree. In this way, the target input tile may better adapt to a processing capability of the artificial intelligence accelerator, thereby further properly improving an acceleration effect of the neural network model. After target output data corresponding to the target input tile is obtained, the group control unit may store, by group, the target output data into at least one output cache of the group cache unit, so as to implement group caching of the target output data.

Figure 3:
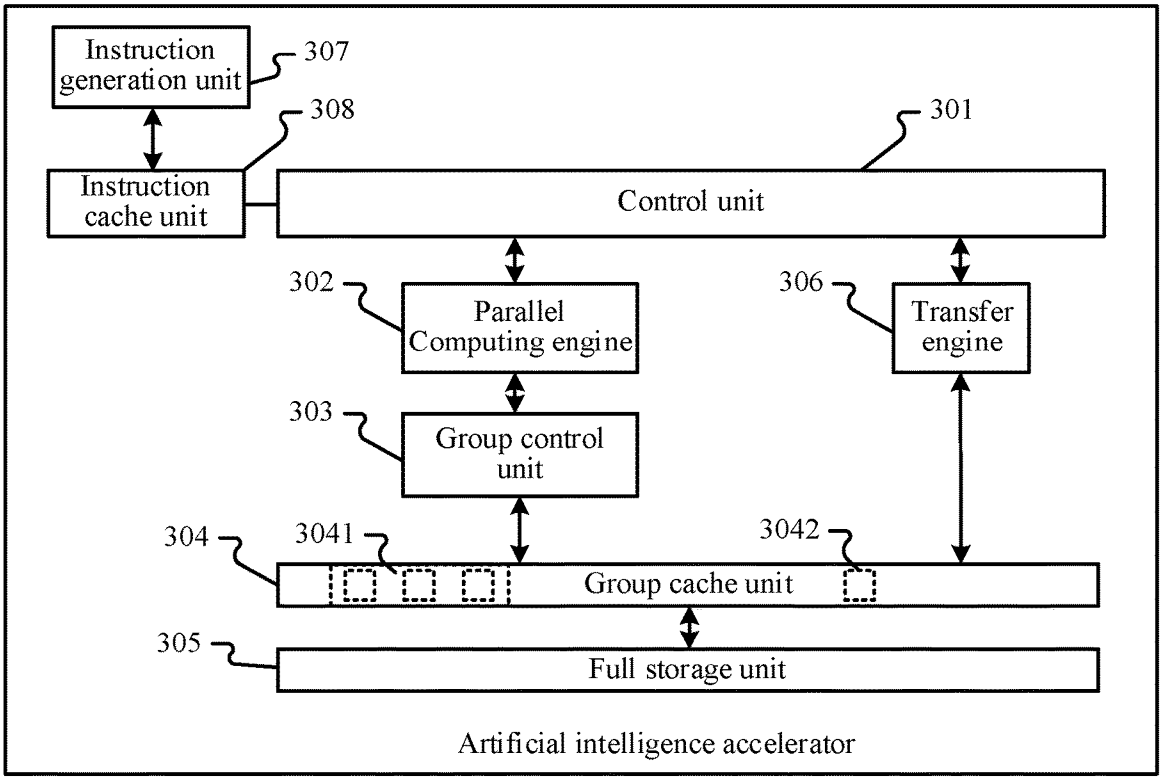
FIG. 3 is a schematic structural diagram of an artificial intelligence accelerator according to another embodiment of the disclosure.

Based on the foregoing description, an embodiment of the disclosure further provides an artificial intelligence accelerator shown in FIG. 3. The artificial intelligence accelerator has a first acceleration parallelism degree and a second acceleration parallelism degree. In this embodiment of the disclosure, one computing engine is still used as an example for description. Referring to FIG. 3, the artificial intelligence accelerator may include a control unit 301, a computing engine 302, a group control unit 303, and a group cache unit 304. The group cache unit 304 is provided with a plurality of output caches 3041 according to the first acceleration parallelism degree. In an embodiment, the group cache unit 304 may further include an input cache 3042.

The control unit 301 is configured to parse a processing instruction for a target network layer in a neural network model to obtain a concurrent instruction, the target network layer being any network layer in the neural network model, an input data set of the target network layer including a plurality of input tiles, and a depth of the input tile being obtained by performing adaptation processing according to the second acceleration parallelism degree. In this embodiment of the disclosure, the target network layer may have a first operation parallelism degree and a second operation parallelism degree. The first operation parallelism degree is used for indicating a quantity of operation functions included in the target network layer, and the second operation parallelism degree is used for indicating a processing data amount in a depth direction each time the target network layer performs parallel processing. To facilitate distinguishing between the first acceleration parallelism degree and the first operation parallelism degree, the first acceleration parallelism degree may be represented by N, and the first operation parallelism degree may be represented by M. M and N are both positive integers.

The computing engine 302 is configured to perform parallel processing on a target input tile in the input data set according to the concurrent instruction to obtain target output data corresponding to the target input tile, the target input tile being any input tile in the input data set.

The group control unit 303 is configured to store, by group, the target output data into at least one output cache 3041 of the group cache unit 304. Because the group cache unit 304 has features of a fast access speed and low power consumption, by storing, by group, the target output data into the at least one output cache 3041 of the group cache unit 304, power consumption may be effectively reduced, and flexible control over the target output data may be implemented.

In an embodiment, the control unit 301 is further configured to parse the processing instruction for the target network layer to obtain a migration instruction. Correspondingly, the artificial intelligence accelerator further includes:

a full storage unit 305, configured to store the input data set of the target network layer and an output data set of the target network layer, the output data set including output data respectively corresponding to the plurality of input tiles. The full storage unit 305 is a storage medium. The full storage unit 305 may be specifically any one of the following: a double rate synchronous dynamic random access memory (DDR), a single rate synchronous dynamic random access memory (SDR), a quadruple rate synchronous dynamic random access memory (QDR), or the like.

The migration engine 306 is configured to perform a data migration operation between the full storage unit 305 and the group cache unit 304 according to the migration instruction obtained by the control unit 301 through parsing. In an example embodiment, the migration engine 306 may be classified into two types: load and store. Migration from the full storage unit 305 to the group cache unit 304 and migration from the group cache unit 304 to the full storage unit 305 need to be completed. The migration engine 306 may view the group cache unit 304 as a whole, and collectively migrate the group cache unit 304 according to the migration instruction. Correspondingly, the foregoing mentioned migration instruction may include a load migration instruction or a store migration instruction. The migration engine 306 receives a load migration instruction transmitted by the control unit 301, and migrates an input tile in the full storage unit 305 to the group cache unit 304 according to the load migration instruction; or the migration engine 306 receives a store migration instruction transmitted by the control unit 301, and migrates, according to the store migration instruction, output data cached in the group cache unit 304 to the full storage unit 305.

Figure 4A:
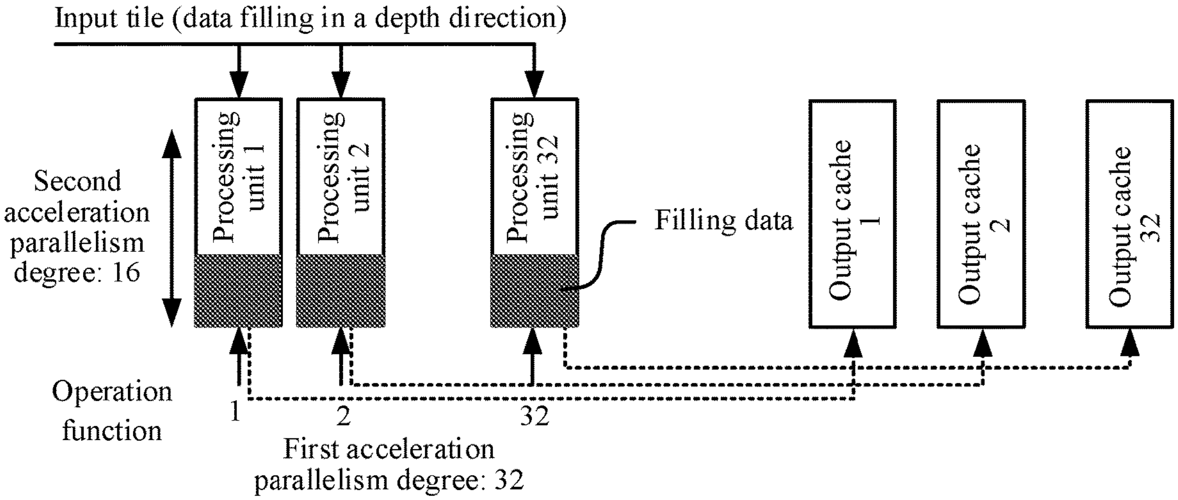
FIG. 4A is a schematic diagram of data filling according to an embodiment of the disclosure.

In another example embodiment, the processing instruction for the target network layer may further include a data adaptation instruction. Correspondingly, the control unit 301 is further configured to parse the processing instruction for the target network layer to obtain the data adaptation instruction, and transmit the data adaptation instruction to the computing engine 302. Correspondingly, the computing engine 302 is further configured to: perform adaptation processing on input data to the target network layer according to the data adaptation instruction, to obtain an input data set to the target network layer, and store the input data set into the full storage unit 305. An occupied internal memory of each input tile is less than or equal to a storage internal memory of the group cache unit 304. The data adaptation instruction is used for instructing the computing engine 302 to adapt the input data to the target network layer to at least one input tile according to the storage internal memory size and a second acceleration parallelism degree of the group cache unit 304. A depth of each input tile is less than or equal to the second acceleration parallelism degree, and an occupied internal memory is less than or equal to the storage internal memory of the group cache unit 304. For ease of description, a depth of each input tile is used as an example for description later. In this case, if the depth of the input tile is less than the second acceleration parallelism degree, data filling processing is performed on the input tile. For example, as shown in FIG. 4A, if the second acceleration parallelism degree is 16 and the depth of the input tile is only 14, two zeros may be filled in the depth direction of the input tile, so that the depth of the input tile is equal to 16.

It can be learned from the foregoing that a parallelism degree difference is generally relatively large between different neural network models, and different network layers within the same neural network model also have different operation parallelism degrees. For this reason, for different operation parallelism degrees, the artificial intelligence accelerator provided in this embodiment of the disclosure uses a grouping or filling manner by using the computing engine 302 to resolve a problem of parallelism degree imbalance. The following describes an example process in which the artificial intelligence accelerator solves the problem of parallelism degree imbalance by using two cases: The target network layer is a network layer with a high parallelism degree, or a network layer with a low parallelism degree.

(1) The target network layer is a network layer with a high parallelism degree:

When the operation parallelism degree of the target network layer is greater than the acceleration parallelism degree of the artificial intelligence accelerator, a data operation involved in the target network layer may be split into a plurality of rounds. A first operation parallelism degree is used as an example. When the target network layer is a network layer with a high parallelism degree, that is, when the first operation parallelism degree of the target network layer is greater than a first acceleration parallelism degree, the computing engine 302 may group operation functions in the target network layer into P function groups, and successively invoke, according to a concurrent instruction, the operation functions in all the function groups to perform parallel processing on the target input tile. P may be determined according to the ratio of M to N; If the ratio of M to N is an integer, P=M/N; or if the ratio of M to N, M/N, is a non-integer, P is rounded up to the nearest integer. For example, it is assumed that the first operation parallelism degree is 1024 (that is, there are 1024 operation functions in the target network layer), and the first acceleration parallelism degree is 32. Because the ratio of 1024 to 32 is equal to 32, and the ratio of 1024 to 32 is an integer, the 1024 operation functions in the target network layer may be grouped into 32 function groups. For another example, it is assumed that the first operation parallelism degree is 1125 (that is, there are 1125 operation functions in the target network layer), and the first acceleration parallelism degree is 32. Because the ratio of 1125 to 32 is equal to 35.15625, and the ratio of 1125 to 32 is a non-integer, 1125 operation functions in the target network layer may be grouped into 36 function groups.

The target network layer includes M operation functions, and each operation function performs operation processing on the target input tile. Therefore, a quantity of target output data corresponding to the target input tile is M, the M pieces of target output data are grouped into P groups, and each group includes N pieces of target output data.

Figure 4B:
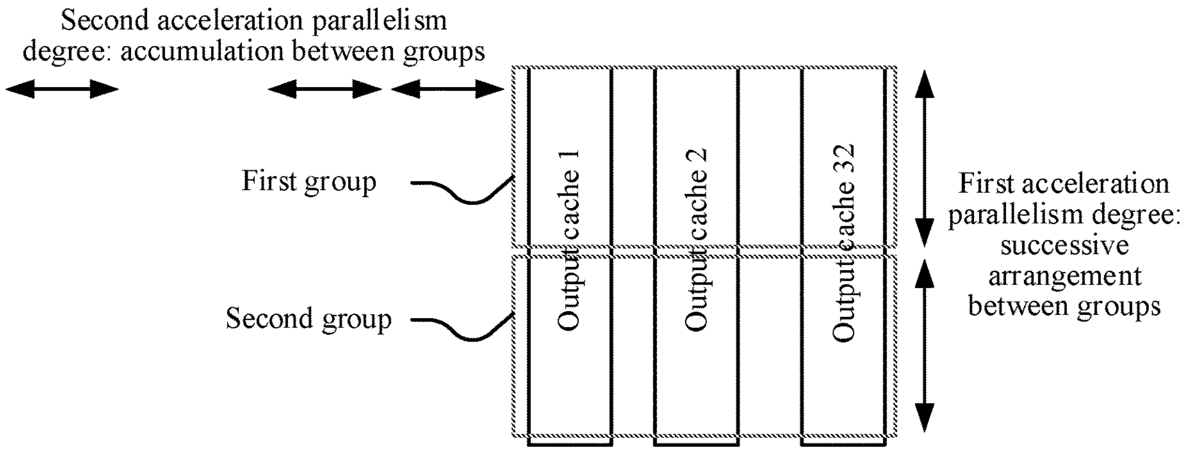
FIG. 4B is a schematic diagram of storing, by group, target output data into a group cache unit according to an embodiment of the disclosure.

Correspondingly, the group control unit 303 may successively store target output data in each group into a corresponding output cache 3041 according to a sequence of groups. In some embodiments, the group control unit 303 stores an nth piece of target output data in each group into an nth output cache 3041 of the group cache unit 304, n∈[1, N]. For example, as shown in FIG. 4B, it is assumed that N is equal to 32. Then, 32 pieces of target output data in the first group may be successively stored into 32 output caches. Then, 32 pieces of target output data in the second group are successively stored into 32 output caches, and so on. If computing of the target network layer is relatively dense, and a second operation parallelism degree of the target network layer is also greater than a second acceleration parallelism degree of the artificial intelligence accelerator, the second operation parallelism degree may be further grouped according to the second acceleration parallelism degree, input tiles of different groups obtained through grouping reuse the same output cache position, and an accumulative relationship exists among output data corresponding to the input tiles of the different groups obtained through grouping.

Figure 4C:
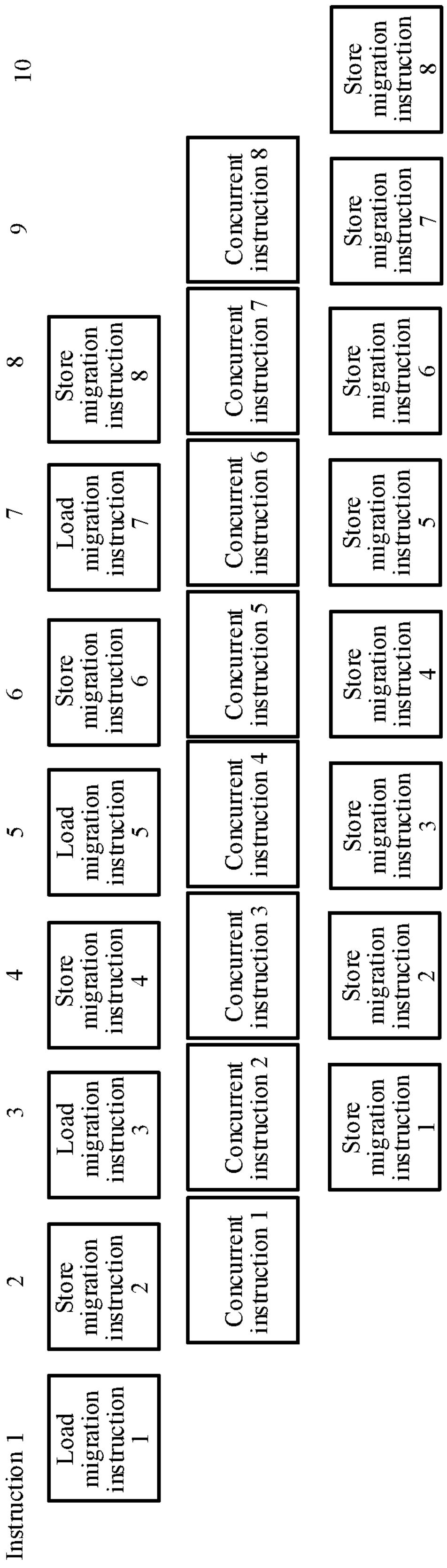
FIG. 4C is a schematic diagram of instruction arrangement at a network layer with a high parallelism degree according to an embodiment of the disclosure.

It may be learned from the foregoing that, for a network layer with a high parallelism degree, a method in which a migration operation and computing are parallel may be used in this embodiment of the disclosure, so as to reduce wait of computing for migration. Based on this, when the target network layer is a network layer with a high parallelism degree, a load migration instruction, a concurrent instruction, and a store migration instruction that are involved in each input tile in the target network layer may be arranged in a parallel pipeline manner (as shown in FIG. 4C). In this way, when performing parallel processing on each input tile according to the concurrent instruction of each input tile, the computing engine 302 does not need to wait for data to be migrated before computing, thereby effectively improving overall performance. That is, instructions corresponding to each input tile in the target network layer are mutually independent. It can be learned that, in this embodiment of the disclosure, the target input tile may independently use one load migration instruction, one concurrent instruction, and one store migration instruction. The migration engine 306 may migrate the target input tile from the full storage unit 305 to the input cache 3041 of the group cache unit 304 according to the load migration instruction corresponding to the target input tile. The computing engine 302 may read the target input tile from the input cache 3042 by using the group control unit 303, and perform parallel processing on the target input tile according to the concurrent instruction corresponding to the target input tile, to obtain the target output data corresponding to the target input tile. The group control unit 303 may store the target output data group into at least one output cache 3041 of the group cache unit 304. The migration engine 306 may migrate the target output data in the at least one output cache 3041 to the full storage unit 305 according to the store migration instruction corresponding to the target input tile.

(2) The target network layer is a network layer with a low parallelism degree.

When the operation parallelism degree of the target network layer is less than the acceleration parallelism degree of the artificial intelligence accelerator, corresponding filling processing may be performed on the target network layer. Using the first operation parallelism degree as an example, when the target network layer is a network layer with a low parallelism degree, that is, when the first operation parallelism degree of the target network layer is less than the first acceleration parallelism degree, the computing engine 302 may perform function filling processing on the target network layer. For example, it is assumed that a quantity of convolution kernels in the target network layer is 8 (that is, the first operation parallelism degree is 8), and the first acceleration parallelism degree of the artificial intelligence accelerator is 32, 32−8=24 additional filling functions may be filled, that is, 24 all-0 filling functions may be filled. The eight operation functions and the 24 filling functions are transmitted to the computing engine for subsequent data operation. To implement combination of output data corresponding to different input tiles in a network layer with a low parallelism degree, and reduce a quantity of store migration times, the computing engine 302 and the group control unit 303 may work together. In some embodiments, the group control unit 303 may first group the input tiles in the input data set into a plurality of input data groups, where each input data group includes I successively arranged input tiles, and I is determined according to the ratio of N to M. For example, it is assumed that the first acceleration parallelism degree is 32 (that is, N=32) and the first operation parallelism degree is 8 (that is, M=8), the group control unit 303 may group the input data in the input data set into a plurality of input data groups, and each input data group includes four successively arranged input tiles. Then, the computing engine 302 may perform, according to arrangement positions of different input tiles in input data groups to which the input tiles belong, offset filling processing of a function on the target network layer, so that output data corresponding to all input tiles may be subsequently combined.

The target input tile is used as an example. The computing engine 302 may perform offset filling processing on operation functions in the target network layer according to an arrangement position of the target input tile in a target input data group to which the target input tile belongs, to obtain a target filling function group; and invoke functions in the target filling function group according to the concurrent instruction to perform parallel processing on the target input tile. The target filling function group includes M operation functions and (N−M) filling functions in the target network layer, N function bits are set in the target filling function group, and a value range of the N function bits is [0, N−1]; the M operation functions are set in valid function bits in the N function bits, and the (N−M) filling functions are set in filling function bits in the N function bits; and a value range of the valid function bit is [(i−1)*M, i*M−1], and the filling function bit is a function bit other than the valid bit in the N function bits; and i represents the arrangement position of the target input tile in the target input data group, i∈[1, I]. For example, N=32 and M=8 are assumed. There are 32 function bits in the target filling function group. A value range of the function bits is [0, 31]. The target input data group may include a total of four input tiles, that is, an arrangement position of the target input tile in the target input data group is i∈[1, 4]. When values of i are respectively 1, 2, 3, and 4, valid function bits and filling function bits of corresponding target filling functions may be specifically shown in Table 1:

TABLE 1

| Value of i | Valid function bit | Filling function bit | Group selection indication |
|---|---|---|---|
| 1 | [0, 7] | [8, 31] | [0, 7] |
| 2 | [8, 15] | [0, 7], [16, 23] | [8, 15] |
| 3 | [16, 23] | [0, 15], [24, 31] | [16, 23] |
| 4 | [24, 31] | [0, 23] | [24, 31] |

The target filling function group includes N functions, and each function performs operation processing on the target input tile. Therefore, the quantity of target output data corresponding to the target input tile is N. The N pieces of target output data include M pieces of valid target output data and (N−M) pieces of invalid target output data, the valid target output data is output data obtained through computing by using the operation function in the valid function bit, and the invalid target output data is output data obtained through computing by using the filling function in the filling function bit. To reduce impact of data migration on performance and power consumption of the artificial intelligence accelerator, in this embodiment of the disclosure, only valid target output data may be cached into the group cache unit 304, so that subsequent store migration operations are performed on only the valid target output data. Based on this, the control unit 301 is further configured to parse the processing instruction for the target network layer to obtain a group selection indication corresponding to the target input tile. Correspondingly, the group control unit 303 stores, by group according to the group selection indication obtained by the control unit 301 through parsing, the M pieces of valid target output data of the N pieces of target output data into M output caches 3041 of the group cache unit 304.

Figure 4D:
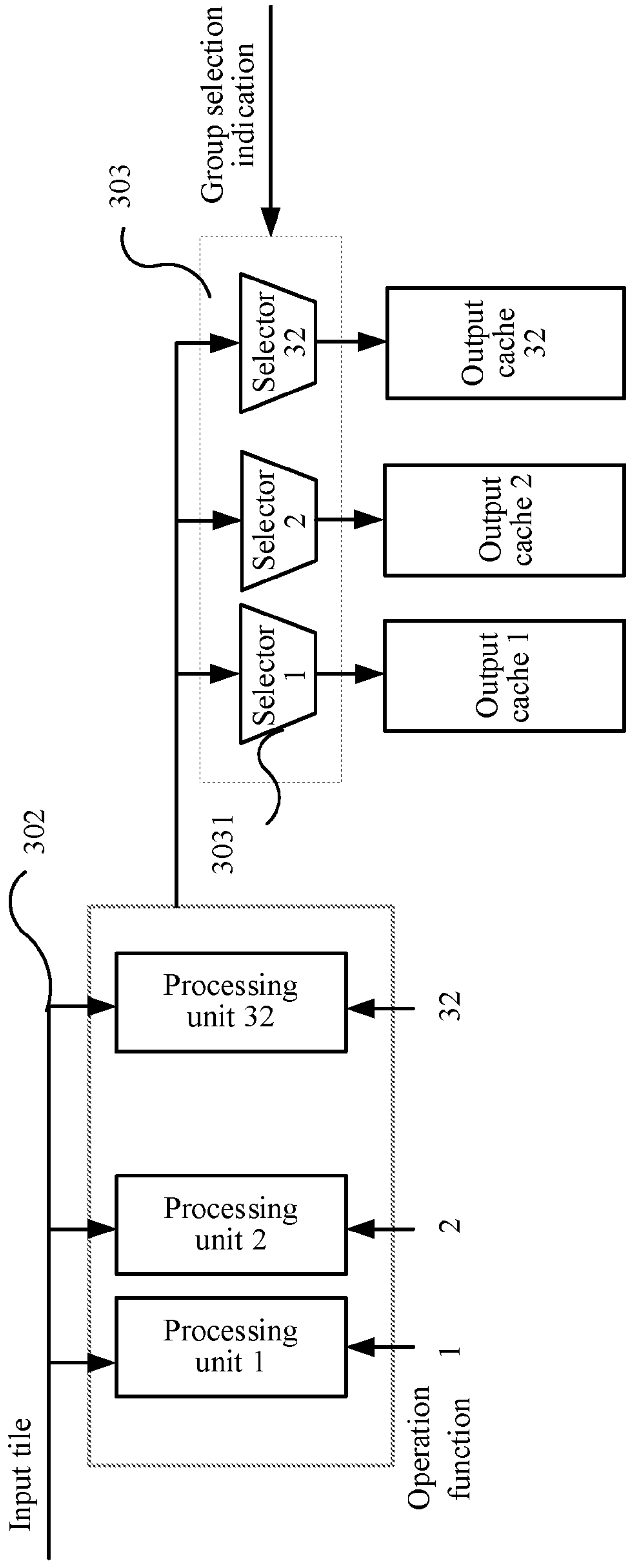
FIG. 4D is a schematic diagram of an internal structure of a group control unit according to an embodiment of the disclosure.

In an example embodiment, a core unit inside the group control unit 303 may be a selector, and a quantity of selectors is consistent with the first acceleration parallelism degree. The group control unit 303 may control output of each selector according to the group selection indication. In some embodiments, the group control unit 303 includes N successively arranged selectors 3031, as shown in FIG. 4D. Each selector may have one position identifier, and a range interval formed by position identifiers of N selectors is [0, N−1]. That is, a position identifier of the first selector is 0, a position identifier of the second selector is 1, . . . , and so on. The group control unit may use, according to the group selection indication, a selector whose position identifier belongs to [(i−1)M+1, i*M] as a target selector, and turns on the target selector to store, by group, the M pieces of valid target output data into the M output caches of the group cache unit, one output cache storing one piece of valid target output data. For example, the foregoing example shown in Table 1 is still used. If the target input tile is the first input tile (that is, i=1) in the target input data group, the group control unit 303 may use a selector whose position identifier belongs to [0, 7] as a target selector, that is, the first to the eighth selectors as the target selectors, and turn on the eight selectors, so as to cache eight valid target output data groups into the first to the eighth output cache 3041 of the group cache unit 304. For accumulative operations of the second acceleration parallelism degree, output data in the output cache 3041 needs to be read first, then accumulated with output data obtained in current computing, and then written into the output cache 3041. In this case, in addition to controlling writing to the output cache 3041, the group selection indication further needs to control reading from the output cache 3041.

Figure 4E:
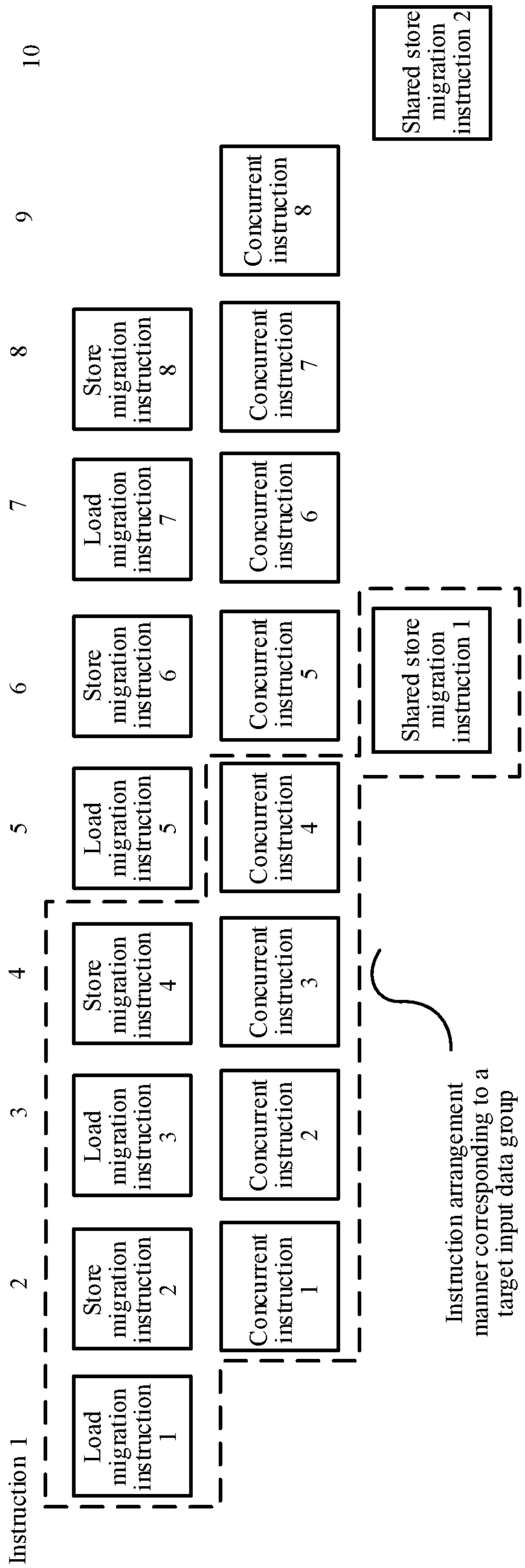
FIG. 4E is a schematic diagram of instruction arrangement at a network layer with a low parallelism degree according to an embodiment of the disclosure.
Figure 4F:
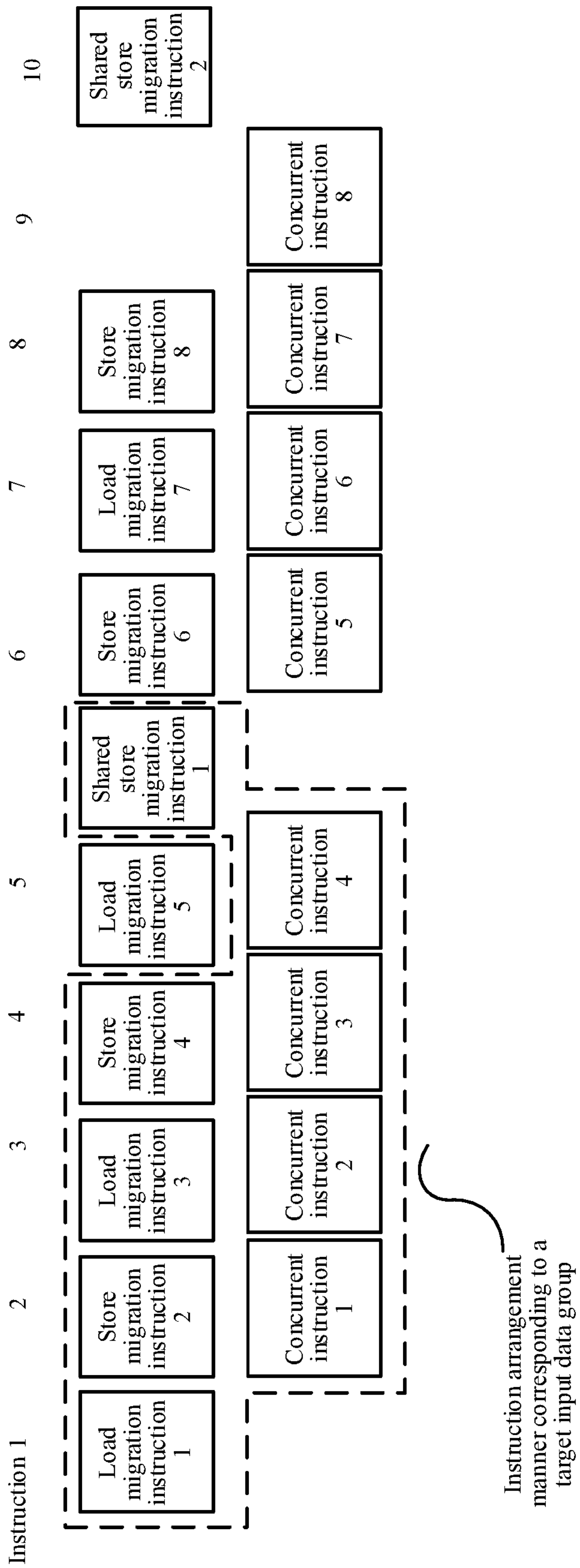
FIG. 4F is a schematic diagram of instruction arrangement at a network layer with a low parallelism degree according to an embodiment of the disclosure.

It can be learned from the foregoing that, for a network layer with a low parallelism degree, in this embodiment of the disclosure, valid output data corresponding to a plurality of input tiles may be interleaved and stored, so as to combine the valid output data corresponding to the plurality of input tiles after the group cache unit 304 is fully accumulated, thereby centrally performing store migration operations on the combined valid output data. Based on this, when the target network layer is a network layer with a low parallelism degree, each input tile in any input data group may independently use a load migration instruction and a concurrent instruction, and share one store migration instruction. It can be learned that, in this embodiment of the disclosure, the target input tile may independently use one load migration instruction and one concurrent instruction, and share one store migration instruction with (I−1) remaining input tiles in the target input data group except the target input tile. In an embodiment, the load migration instruction, the concurrent instruction, and the shared store migration instruction involved in each input tile in the target input data group may be arranged in a parallel pipeline manner. For example, if the target input data group includes four input tiles, for an instruction arrangement manner corresponding to the target input data group, reference may be made to FIG. 4E. In another embodiment, the shared store migration instruction in the target input data group may be serially arranged with the load migration instruction involved in each input tile in the target input data group, and then arranged in a parallel manner with the concurrent instruction involved in each input tile in the target input data group. For example, if the target input data group includes four input tiles, for an instruction arrangement manner corresponding to the target input data group, reference may be made to FIG. 4F. An instruction arrangement is performed in the manner shown in FIG. 4F, so that a quantity of levels of a pipeline may be reduced (decreases from three levels to two levels), and a delay may be reduced to a certain extent. In addition, a quantity of store migration times may be reduced, thereby reducing power consumption. In addition, the entire pipeline is not interrupted, and higher performance may be obtained.

Correspondingly, the migration engine 306 may successively migrate input tiles in the target input data group from the full storage unit 305 to the input cache 3042 of the group cache unit 304 according to a load migration instruction corresponding to the input tiles in the target input data group. The computing engine 302 may successively read the input tiles in the target input data group from the input cache 3042 by using the group control unit 303, and perform parallel processing on the input tiles in the target input data group according to a concurrent instruction corresponding to the input tiles in the target input data group, to obtain output data corresponding to the input tiles in the target input data group. The group control unit 303 successively stores, by group, the output data corresponding to the input tiles in the target input data group into at least one output cache 3041 of the group cache unit 304. After output data corresponding to an $I^{th}$ input tile in the target input data group is cached into the group cache unit 304, the migration engine 306 combines the output data corresponding to the input tiles in the target input data group according to the store migration instruction shared by the target input data group, and migrates the combined output data from the group cache unit 304 to the full storage unit 305. It can be learned that the artificial intelligence accelerator provided in this embodiment of the disclosure may interleave and store valid output data corresponding to different input tiles in the same input data group by using the group control unit 303. After the group cache unit 304 is fully accumulated (that is, each output cache in the group cache unit 304 stores output data), a store migration operation is centrally performed on output data corresponding to all input tiles in the same input data group. In this way, a quantity of store migration times may be reduced, bandwidth used for a store migration operation may be saved, and the saved bandwidth may be used for improving efficiency of a load migration operation. In addition, it may be ensured that there is no invalid output data in the store migration operation, and power consumption consumed by store migration may be effectively reduced.

It may be learned from the foregoing description that the computing engine 302, the group control unit 303, and the on-chip group storage unit 304 in this embodiment of the disclosure may have a grouping capability, so that the artificial intelligence accelerator may flexibly control output of neural network models with different parallelism degrees and network layers with different operation parallelism degrees in the same neural network model, and all input tiles may share an output cache. For a network layer with a low parallelism degree, a store migration operation of migrating output data corresponding to each input tile from the group cache unit 304 to the full storage unit 305 may be combined with reference to this capability of the artificial intelligence accelerator. Because the store migration operation needs to access the full storage unit 305, power consumption of this access will be two orders of magnitude higher than that of a data operation in the artificial intelligence accelerator. In addition, power consumption for accessing the full storage unit 305 at a time is more than 100 times of power consumption for accessing the group cache unit 304, and more than 600 times of that of a cache accumulation operation. Therefore, in this embodiment of the disclosure, in a manner of performing a store migration operation after all output data is combined, a quantity of store migration times may be reduced, and power consumption of the artificial intelligence accelerator is greatly reduced. For a network layer with a high parallelism degree, a method in which a migration operation and computing are parallel may be used so as to reduce wait of computing for migration.

In another example embodiment, the artificial intelligence accelerator may further include:

an instruction generation unit 307, configured to: generate a processing instruction for each network layer in the neural network model, and store the processing instruction for each network layer into the full storage unit; and an instruction cache unit 308, configured to: load the processing instruction for the target network layer of the neural network model from the full storage unit, and cache the processing instruction for the target network layer for reading by the control unit.

The control unit 301, the computing engine 302, the group control unit 303, the group cache unit 304, the migration engine 306, and the instruction cache unit 308 may all be specifically disposed in the processing chip in the artificial intelligence accelerator.

The artificial intelligence accelerator in this embodiment of the disclosure may effectively improve an acceleration effect of the neural network model. The group control unit and the group cache unit are disposed in the artificial intelligence accelerator, so that the artificial intelligence accelerator has a flexible data group control capability, thereby implementing flexible control over output data. By combining instructions at an instruction layer, store migration operations of a network layer with a low parallelism degree may be greatly reduced, overall power consumption of the artificial intelligence accelerator may be reduced, and performance thereof may be improved. In addition, the entire artificial intelligence accelerator has low implementation costs and high flexibility, may adapt to an evolving neural network algorithm, especially an application scenario in which more and more high-definition pictures are used, and has relatively high application value.

Figure 5:
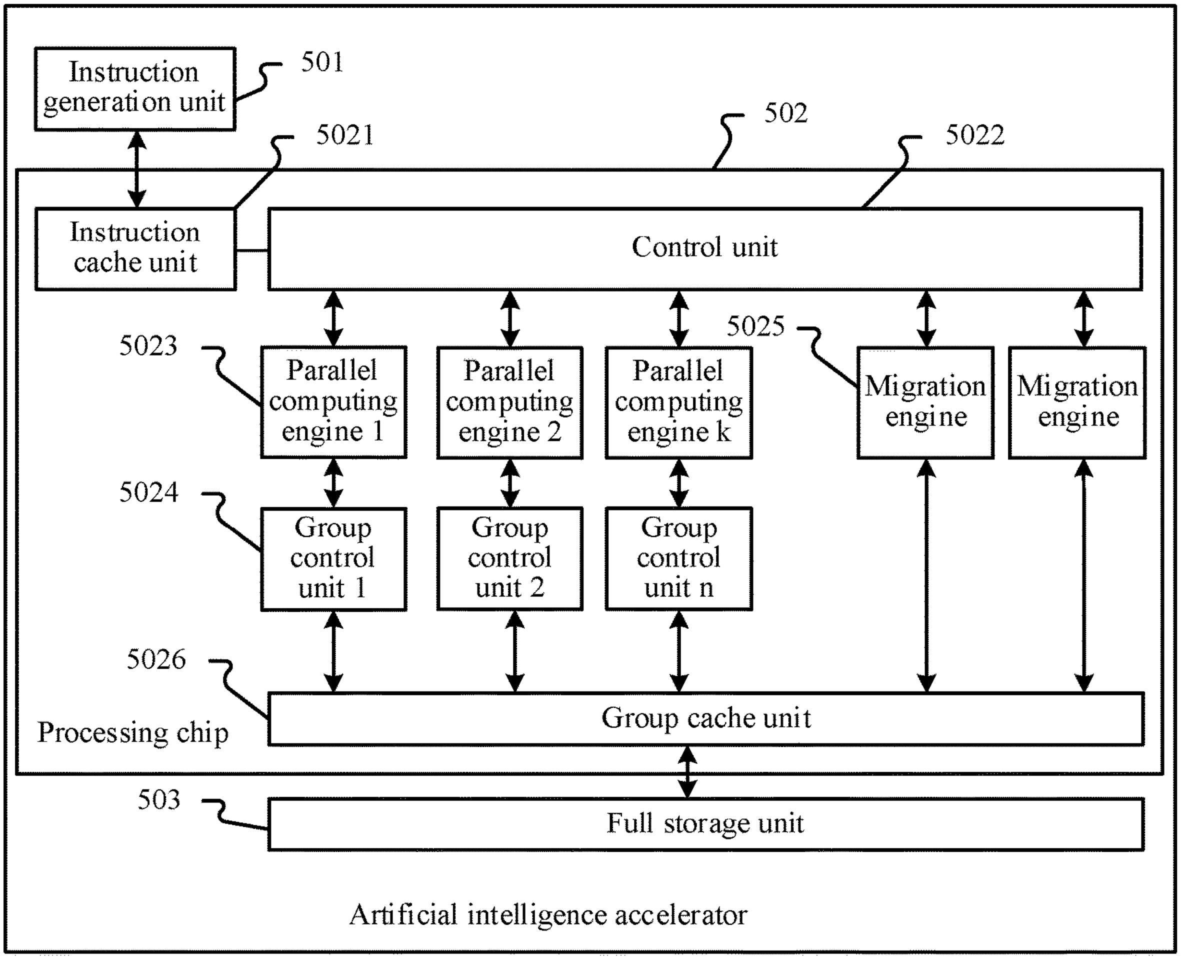
FIG. 5 is a schematic structural diagram of an artificial intelligence accelerator according to another embodiment of the disclosure.

Both the artificial intelligence accelerators shown in FIG. 2 and FIG. 3 are described by using one computing engine as an example. In an embodiment, the artificial intelligence accelerator may include a plurality of computing engines, such as a convolution engine and a pooling engine. Based on this, an embodiment of the disclosure further proposes a schematic structural diagram of an artificial intelligence accelerator shown in FIG. 5. Referring to FIG. 5, the artificial intelligence accelerator provided in this embodiment of the disclosure may include at least a processing chip 502. In an embodiment, the artificial intelligence accelerator further includes an instruction generation unit 501 and an off-chip full storage unit 503. The processing chip 502 includes at least an instruction cache unit 5021, a control unit 5022, k computing engines 5023, k group control units 5024, at least one migration engine 5025, an on-chip group cache unit 5026, and the like, where k is a positive integer, and the k computing engines may include but are not limited to a convolution engine, a pooling engine, and the like.

The instruction generation unit 501 is configured to: generate a processing instruction for each network layer in a neural network model offline, and complete, by using the processing instruction, pipeline control over each engine (for example, the computing engine 5023 and the migration engine 5025). A processing instruction for any network layer may include but is not limited to a data adaptation instruction, a concurrent instruction, and a migration instruction. For a network layer with a high parallelism degree, data computing processing and a data migration operation may be performed in parallel by using a processing instruction, thereby reducing wait time brought by the data migration operation to data computing. For a network layer with a low parallelism degree, combination of store migration operations on a plurality of input tiles and parallel adjustment of another engine may be implemented by using a processing instruction, so as to reduce inefficient migration and reduce power consumption.

The instruction cache unit 5021 in the processing chip 502 is configured to cache the processing instruction for each network layer in the neural network model generated by the instruction generation unit 501, so as to be extracted by the control unit 5022. The control unit 5022 is configured to: complete parsing of a processing instruction for each network layer, transmit a parsed concurrent instruction to different computing engines 5023, so as to control the computing engines 5023 to perform computing processing, and transmit a parsed migration instruction to the migration engine 5025, so as to control the migration engine 5025 to perform a migration operation. In addition, the group control unit 5024 may be further controlled to complete, according to a corresponding instruction, read/write group control for a network layer with a low parallelism degree, so as to combine output data of the network layer with a low parallelism degree at minimum costs, thereby reducing an invalid operation of data migration. The computing engine 5023 is configured to access the group cache unit 5026 by using the group control unit 5024; and complete an AI operation on input data to each network layer according to a concurrent instruction of each network layer, such as a convolution operation and a pooling operation. The group control unit 5024 is configured to perform a grouping operation on data as instructed by the control unit 5022, and may be configured to perform grouping processing on input data to or output data at network layers of neural network models with various parallelism degrees. The migration engine 5025 is configured to: perform a data migration operation between the full storage unit 503 and the group cache unit 5026 as instructed by the control unit 5022. The group cache unit 5026 is configured to cache data required for computing and may support group cache of output data under control of the group control unit 5024.

The full storage unit 503 is configured to store full computing data, such as an input data set and an output data set of a neural network model.

Figure 6A:
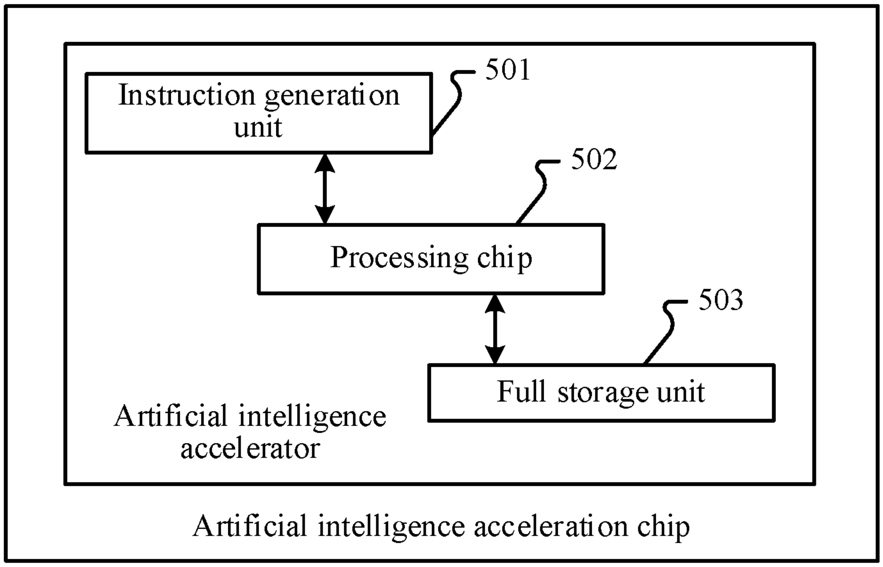
FIG. 6A is a schematic structural diagram of an artificial intelligence acceleration chip according to an embodiment of the disclosure.
Figure 6B:
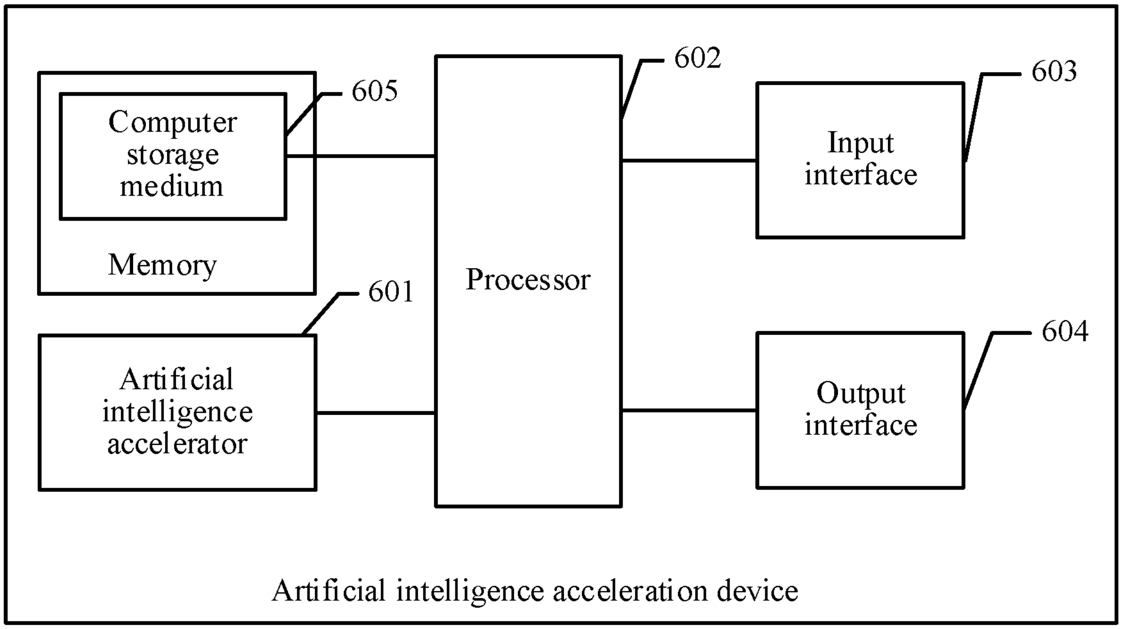
FIG. 6B is a schematic structural diagram of an artificial intelligence acceleration device according to an embodiment of the disclosure.

Based on the foregoing related description of the artificial intelligence accelerator, an embodiment of the disclosure further provides an artificial intelligence acceleration chip shown in FIG. 6A. The artificial intelligence acceleration chip is packaged with the foregoing artificial intelligence accelerator. In an example embodiment, the artificial intelligence accelerator packaged in the artificial intelligence acceleration chip includes at least a processing chip 502. In an embodiment, the artificial intelligence accelerator packaged in the artificial intelligence acceleration chip further includes an instruction generation unit 501 and a full storage unit 503. The processing chip 502 includes a control unit, a computing engine, a group control unit, and a group cache unit. The processing chip 502 may further include a migration engine and an instruction cache unit. In another embodiment, an embodiment of the disclosure further provides an artificial intelligence acceleration device shown in FIG. 6B. The artificial intelligence acceleration device may include but is not limited to a terminal device such as a smartphone, a tablet computer, a laptop computer, or a desktop computer; or a service device such as a data server, an application server, or a cloud server. In an example embodiment, the artificial intelligence acceleration device may include the foregoing mentioned artificial intelligence accelerator 601. In an embodiment, the artificial intelligence acceleration device may further include a processor 602, an input interface 603, an output interface 604, and a computer storage medium 605. The computer storage medium 605 may be stored in a memory of the artificial intelligence acceleration device, and the computer storage medium 605 is configured to store a computer program. The computer program includes program instructions, and the processor 602 is configured to execute the program instructions stored in the computer storage medium 605. The artificial intelligence acceleration device may effectively accelerate a processing procedure of a neural network model by using the internal artificial intelligence accelerator, so as to improve an acceleration effect of the neural network model. In this embodiment of the disclosure, the artificial intelligence accelerator has low implementation costs, and may be easily extended by using flexible instruction driving. A problem of high power consumption caused by parallelism degrees of different network layers is well solved. In addition, flexible control over a processing instruction at each network layer may further implement flexible adjustment of an entire computing pipeline, and further optimize overall performance between engines.

Figure 7:
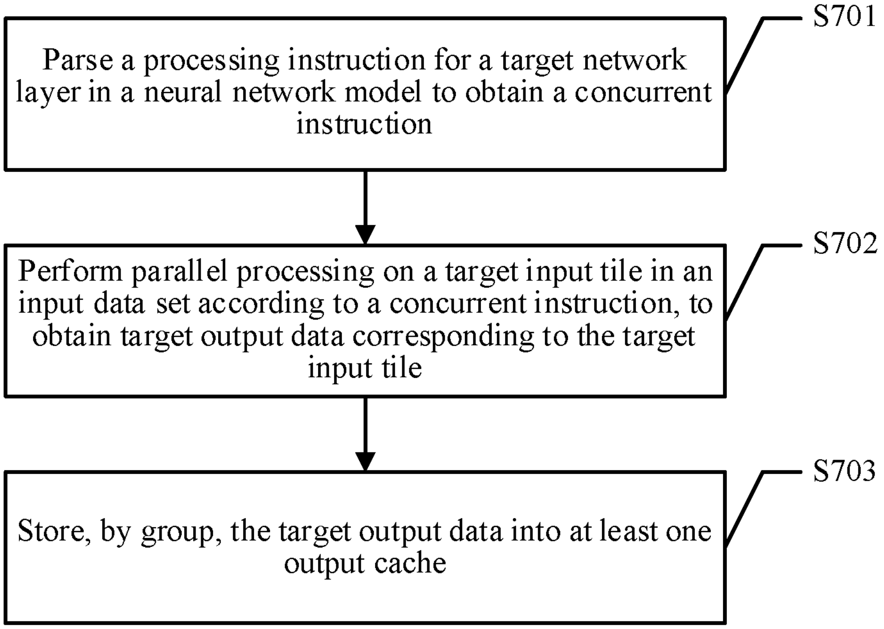
FIG. 7 is a schematic flowchart of a data processing method according to an embodiment of the disclosure.

Based on the foregoing related description of the artificial intelligence accelerator, an embodiment of the disclosure provides a data processing method, and the data processing method may be applied to the foregoing mentioned artificial intelligence accelerator. The artificial intelligence accelerator has a first acceleration parallelism degree and a second acceleration parallelism degree, the first acceleration parallelism degree is used for indicating a quantity of operation functions used each time the artificial intelligence accelerator performs parallel processing, and the second acceleration parallelism degree is used for indicating a processing data amount in a depth direction each time the artificial intelligence accelerator performs parallel processing. A plurality of output caches may be disposed in the artificial intelligence accelerator according to the first acceleration parallelism degree. Referring to FIG. 7, the data processing method may include the following operations S701-S703:

S701. Parse a processing instruction for a target network layer in a neural network model to obtain a concurrent instruction.

The target network layer is any network layer in the neural network model, an input data set of the target network layer includes a plurality of input tiles, and a depth of the input tile is obtained by performing adaptation processing according to the second acceleration parallelism degree. The target network layer has a first operation parallelism degree and a second operation parallelism degree, the first operation parallelism degree is used for indicating a quantity of operation functions included in the target network layer, and the second operation parallelism degree is used for indicating a processing data amount in a depth direction each time the target network layer performs parallel processing. For ease of differentiation, the first acceleration parallelism degree of the artificial intelligence accelerator may be represented by N, and the first operation parallelism degree of the target network layer may be represented by M. M and N are both positive integers.

S702. Perform parallel processing on a target input tile in an input data set according to a concurrent instruction, to obtain target output data corresponding to the target input tile.

S703. Store, by group, the target output data into at least one output cache.

In operations S702 and S703, the target input tile is any input tile in the input data set. In an embodiment, when the first operation parallelism degree is greater than the first acceleration parallelism degree, an example embodiment of operation S702 may be: grouping operation functions in the target network layer into P function groups, and successively invoking operation functions in each function group according to the concurrent instruction to perform parallel processing on the target input tile, P being determined according to the ratio of M to N. In this implementation, there are M pieces of target output data, the M pieces of target output data are grouped into P groups, and each group includes N pieces of target output data. Correspondingly, an example embodiment of operation S703 may be: storing an nth piece of target output data in each group into an nth output cache of a group cache unit, n∈[1, N].

In another embodiment, when the first operation parallelism degree is less than the first acceleration parallelism degree, the artificial intelligence accelerator may group the input tiles in the input data set into a plurality of input data groups, where each input data group includes I successively arranged input tiles, and I is determined according to the ratio of N to M. Correspondingly, an example embodiment of operation S702 may be: performing offset filling processing on operation functions in the target network layer according to an arrangement position of the target input tile in a target input data group to which the target input tile belongs, to obtain a target filling function group; and invoking functions in the target filling function group according to the concurrent instruction to perform parallel processing on the target input tile. The target filling function group herein includes M operation functions and (N−M) filling functions in the target network layer, N function bits are set in the target filling function group, a value range of the N function bits is [0, N−1]. The M operation functions are set in valid function bits in the N function bits, and the (N−M) filling functions are set in filling function bits in the N function bits; a value range of the valid function bit is [(i−1)*M, i*M−1], and the filling function bit is a function bit other than the valid bit in the N function bits; and i represents the arrangement position of the target input tile in the target input data group, i∈[1, I].

In this implementation, there are N pieces of target output data. The N pieces of target output data include M pieces of valid target output data and (N−M) pieces of invalid target output data, the valid target output data is output data obtained through computing by using the operation function in the valid function bit, and the invalid target output data is output data obtained through computing by using the filling function in the filling function bit. Correspondingly, an example embodiment of operation S703 may be: parsing the processing instruction for the target network layer to obtain a group selection indication corresponding to the target input tile; and storing, by group according to the group selection indication, the M pieces of valid target output data into the M output caches of the group cache unit, one output cache storing one piece of valid target output data.

The artificial intelligence accelerator in this embodiment of the disclosure has the first acceleration parallelism degree and the second acceleration parallelism degree; and a plurality of output caches are disposed in the artificial intelligence accelerator according to the first acceleration parallelism degree, so that the artificial intelligence accelerator has a grouping capability, and may flexibly control output data of each network layer in the neural network model. When accelerating the neural network model, the artificial intelligence accelerator may first parse a processing instruction for a target network layer in the neural network model, so as to obtain a concurrent instruction. Second, the artificial intelligence accelerator may perform parallel processing on a target input tile in the target network layer according to the concurrent instruction, so that a processing procedure of the neural network model may be effectively accelerated in a parallel processing manner. A depth of the target input tile is obtained through adaptation according to the second parallelism degree. In this way, the target input tile may better adapt to a processing capability of the artificial intelligence accelerator, thereby further properly improving an acceleration effect of the neural network model. After target output data corresponding to the target input tile is obtained, the artificial intelligence accelerator may store, by group, the target output data into at least one output cache of the group cache unit, so as to implement group caching of the target output data.

Figure 8:
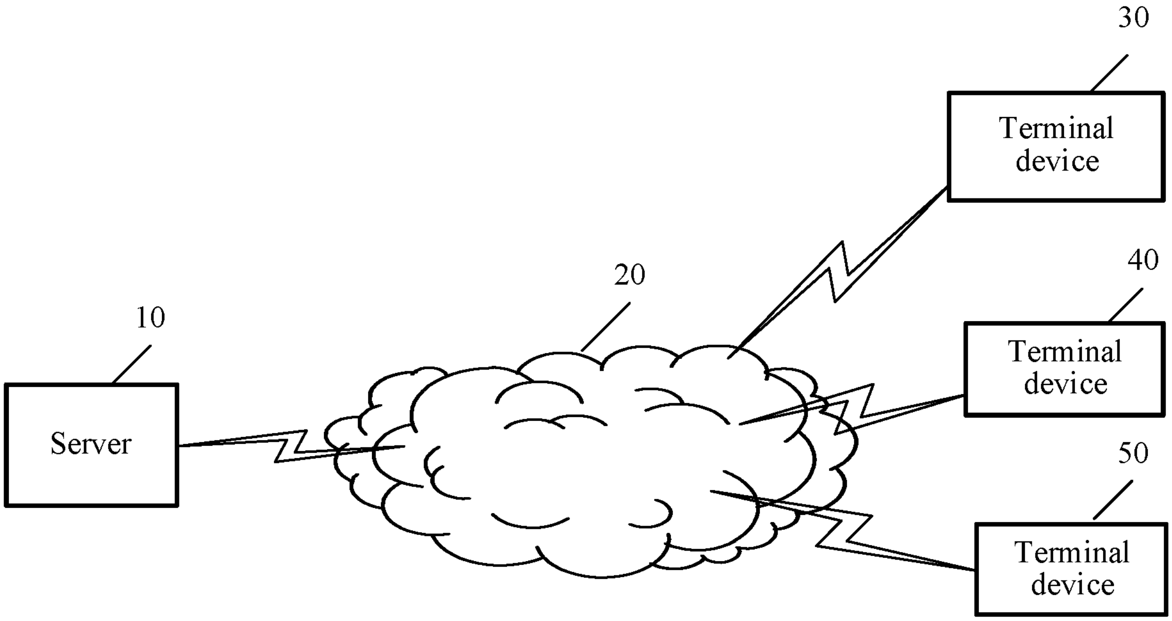
FIG. 8 is a schematic diagram of a system for applying an artificial intelligence accelerator according to an embodiment of the disclosure.

FIG. 8 is a schematic diagram of a system for applying an artificial intelligence accelerator according to an embodiment of the disclosure. As shown in FIG. 8, the system may include a server 10 and a plurality of terminal devices 30, 40, and 50. These devices may communicate with each other by using a network 20. The artificial intelligence accelerator in each embodiment may be applied to one or more of the server 10 and the plurality of terminal devices 30, 40, and 50. For example, the terminal device 30 may process a photographed image by using the artificial intelligence accelerator. For another example, the server 10 may process, by using the artificial intelligence accelerator, an image provided by the terminal device 40. For still another example, the server 10 and the terminal device 50 may separately perform some operations of the data processing method in the embodiments, so as to implement the data processing method.

The artificial intelligence accelerator in the embodiments of the disclosure has a first acceleration parallelism degree and a second acceleration parallelism degree; a group control unit and a group cache unit are disposed in the artificial intelligence accelerator, and a plurality of output caches are disposed in the group cache unit according to the first acceleration parallelism degree, so that the group control unit and the group cache unit have a grouping capability, and output data of each network layer in a neural network model may be flexibly controlled. When accelerating the neural network model, the artificial intelligence accelerator may first parse a processing instruction for a target network layer in the neural network model by using a control unit, so as to obtain a concurrent instruction. Second, a computing engine may perform parallel processing on a target input tile in the target network layer according to the concurrent instruction, so that a processing procedure of the neural network model may be effectively accelerated in a parallel processing manner. A depth of the target input tile is obtained through adaptation according to the second parallelism degree. In this way, the target input tile may better adapt to a processing capability of the artificial intelligence accelerator, thereby further properly improving an acceleration effect of the neural network model. After target output data corresponding to the target input tile is obtained, the group control unit may store, by group, the target output data into at least one output cache of the group cache unit, so as to implement group caching of the target output data.

At least one of the components, elements, modules or units described herein may be embodied as various numbers of hardware, software and/or firmware structures that execute respective functions described above, according to an example embodiment. For example, at least one of these components, elements or units may use a direct circuit structure, such as a memory, a processor, a logic circuit, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions, and executed by one or more microprocessors or other control apparatuses. Also, at least one of these components, elements or units may further include or implemented by a processor such as a central processing unit (CPU) that performs the respective functions, a microprocessor, or the like. Two or more of these components, elements or units may be combined into one single component, element or unit which performs all operations or functions of the combined two or more components, elements of units. Also, at least part of functions of at least one of these components, elements or units may be performed by another of these components, element or units. Further, although a bus is not illustrated in the block diagrams, communication between the components, elements or units may be performed through the bus. Functional aspects of the above embodiments may be implemented in algorithms that execute on one or more processors. Furthermore, the components, elements or units represented by a block or processing operations may employ any number of related art techniques for electronics configuration, signal processing and/or control, data processing and the like.

What is disclosed above is merely example embodiments of the disclosure, and certainly is not intended to limit the scope of the claims of the disclosure. Therefore, equivalent variations made in accordance with the claims of the disclosure shall fall within the scope of the disclosure.

What is claimed is:

1. An artificial intelligence accelerator comprising a control unit, a computing engine, a group control unit, and a group cache unit and the artificial intelligence accelerator being executed on a hardware platform including at least one of a field programmable gate array (FPGA) or an application specific integrated circuit (ASIC);

the control unit being configured to parse a processing instruction for a target network layer in a neural network model to obtain a concurrent instruction, an input data set of the target network layer comprising a plurality of input tiles, and a depth of an input tile being obtained by performing adaptation processing according to a second quantity, the second quantity being an amount of processing data in each sliding window in a depth direction each time parallel processing is performed, and the adaptation processing being such that, in the depth direction, the input data set is adapted to the plurality of input tiles in which the second quantity of pieces of data are in one group;

the computing engine comprising a plurality of processing elements and being configured to perform parallel processing on a target input tile in the input data set according to the concurrent instruction, to obtain target output data corresponding to the target input tile, wherein each time the computing engine performs the parallel processing, a first quantity of the plurality of processing elements are invoked simultaneously, such that the artificial intelligence accelerator has a capability to respectively process data with a depth of the second quantity in parallel by simultaneously performing the first quantity of operation functions;

the group cache unit being provided with the first quantity of output caches; and the group control unit being configured to store, by group, the target output data into at least one output cache of the group cache unit, wherein the target network layer has a first operation parallelism degree indicating a quantity of operation functions comprised in the target network layer, wherein the group control unit groups the input tiles in the input data set into a plurality of input data groups, each input data group comprising successively arranged input tiles, a number of which is determined based on the first operation parallelism degree and the first quantity, and wherein the computing engine performs offset filling processing on operation functions in the target network layer according to an arrangement position of the target input tile in a target input data group to which the target input tile belongs, to obtain a target filling function group; and invokes functions in the target filling function group according to the concurrent instruction to perform parallel processing on the target input tile.

2. The artificial intelligence accelerator according to claim 1, wherein the control unit is further configured to parse the processing instruction for the target network layer to obtain a migration instruction; and the artificial intelligence accelerator further comprises:

a full storage unit, configured to store the input data set of the target network layer and an output data set of the target network layer, the output data set comprising output data respectively corresponding to the plurality of input tiles; and a migration engine, configured to perform a data migration operation between the full storage unit and the group cache unit according to the migration instruction.

3. The artificial intelligence accelerator according to claim 2, wherein the migration instruction comprises at least one of a load migration instruction or a store migration instruction; and the migration engine receives a load migration instruction from the control unit, and migrates an input tile in the full storage unit to the group cache unit according to the load migration instruction; and/or the migration engine receives a store migration instruction from the control unit, and migrates, according to the store migration instruction, output data cached in the group cache unit to the full storage unit.

4. The artificial intelligence accelerator according to claim 3, wherein the target network layer has a second operation parallelism degree indicating a processing data amount in the depth direction each time the target network layer performs parallel processing, the second operation parallelism degree being equal to the first quantity.

5. The artificial intelligence accelerator according to claim 4, wherein the first operation parallelism degree is greater than the first quantity, and the computing engine groups operation functions in the target network layer into P function groups, and successively invokes operation functions in each function group according to the concurrent instruction to perform parallel processing on the target input tile, P being determined according to a ratio of M to N, M representing the first operation parallelism degree and N representing the first quantity, M and N being positive integers.

6. The artificial intelligence accelerator according to claim 5, wherein the group cache unit comprises an input cache, and the target input tile independently uses one load migration instruction, one concurrent instruction, and one store migration instruction;

the migration engine migrates the target input tile from the full storage unit to the input cache of the group cache unit according to a load migration instruction corresponding to the target input tile;

the computing engine reads the target input tile from the input cache by using the group control unit, and performs parallel processing on the target input tile according to a concurrent instruction corresponding to the target input tile, to obtain the target output data corresponding to the target input tile; and the migration engine migrates the target output data in the corresponding one of the first quantity of output caches to the full storage unit according to a store migration instruction corresponding to the target input tile.

7. The artificial intelligence accelerator according to claim 5, wherein a quantity of the target output data is M, the M pieces of target output data are grouped into P groups, and each group comprises N pieces of target output data; and the group control unit stores an nth piece of target output data in each group into an nth output cache of the group cache unit, n∈[1, N].

8. The artificial intelligence accelerator according to claim 4, wherein the first operation parallelism degree is less than the first quantity, and each input data group comprising I successively arranged input tiles, and I being determined according to a ratio of N to M, M representing the first operation parallelism degree and N representing the first quantity, M and N being positive integers;

the target filling function group comprises M operation functions and (N−M) filling functions in the target network layer, N function bits are set in the target filling function group, and a value range of the N function bits is [0, N−1]; the M operation functions are set in valid function bits in the N function bits, and the (N−M) filling functions are set in filling function bits in the N function bits; and a value range of a valid function bit is [(i−1)*M, i*M−1], and a filling function bit is a function bit other than a valid bit in the N function bits; and i represents the arrangement position of the target input tile in the target input data group, i∈[1, I].

9. The artificial intelligence accelerator according to claim 8, wherein the group cache unit comprises an input cache, and the target input tile independently uses one load migration instruction and one concurrent instruction, and shares one store migration instruction with (I−1) remaining input tiles in the target input data group except the target input tile;

the migration engine successively migrates input tiles in the target input data group from the full storage unit to the input cache of the group cache unit according to a load migration instruction corresponding to the input tiles in the target input data group;

the computing engine successively reads the input tiles in the target input data group from the input cache by using the group control unit, and performs parallel processing on the input tiles in the target input data group according to a concurrent instruction corresponding to the input tiles in the target input data group, to obtain output data corresponding to the input tiles in the target input data group;

the group control unit successively stores, by group, the output data corresponding to the input tiles in the target input data group into the corresponding one of the first quantity of output caches of the group cache unit; and after output data corresponding to an $I^{th}$ input tile in the target input data group is cached into the group cache unit, the migration engine combines the output data corresponding to the input tiles in the target input data group according to the store migration instruction shared by the target input data group, and migrates the combined output data from the group cache unit to the full storage unit.

10. The artificial intelligence accelerator according to claim 8, wherein a quantity of the target output data is N, the N pieces of target output data comprise M pieces of valid target output data and (N−M) pieces of invalid target output data, the valid target output data is output data obtained through computing by using an operation function in the valid function bit, and the invalid target output data is output data obtained through computing by using the filling function in the filling function bit;

the control unit is further configured to parse the processing instruction for the target network layer to obtain a group selection indication corresponding to the target input tile; and the group control unit stores, by group according to the group selection indication, the M pieces of the valid target output data of the N pieces of target output data into M output caches of the group cache unit.

11. The artificial intelligence accelerator according to claim 10, wherein the group control unit comprises N successively arranged selectors, and a range interval formed by position identifiers of the N selectors is [0, N−1]; and the group control unit uses, according to the group selection indication, a selector whose position identifier belongs to [(i−1)M+1, i*M] as a target selector, and turns on the target selector to store, by group, the M pieces of the valid target output data into the M output caches of the group cache unit, one output cache storing one piece of the valid target output data.

12. The artificial intelligence accelerator according to claim 2, wherein the artificial intelligence accelerator is executed on the hardware platform to:

generate a processing instruction for each network layer in the neural network model, and store the processing instruction for each network layer into the full storage unit; and load the processing instruction for the target network layer of the neural network model from the full storage unit, and cache the processing instruction for the target network layer for reading by the control unit.

13. A data processing method, performed by an artificial intelligence accelerator comprising a control unit, a computing engine, a group control unit, and a group cache unit and the artificial intelligence accelerator being executed on a hardware platform including at least one of a field programmable gate array (FPGA) or an application specific integrated circuit (ASIC), the data processing method comprising:

parsing, by using the control unit, a processing instruction for a target network layer in a neural network model to obtain a concurrent instruction, an input data set of the target network layer comprising a plurality of input tiles, and a depth of an input tile being obtained by performing adaptation processing according to a second quantity, the second quantity being an amount of processing data in each sliding window in a depth direction each time parallel processing is performed, and the adaptation processing being such that, in the depth direction, the input data set is adapted to the plurality of input tiles in which the second quantity of pieces of data are in one group;

performing, by using the computing engine, parallel processing on a target input tile in the input data set according to the concurrent instruction to obtain target output data corresponding to the target input tile, wherein the computing engine comprises a plurality of processing elements, and each time the computing engine performs the parallel processing, a first quantity of the plurality of processing elements are invoked simultaneously, such that the artificial intelligence accelerator has a capability to respectively process data with a depth of the second quantity in parallel by simultaneously performing the first quantity of operation function; and storing by using the group control unit, by group, the target output data into the group cache unit that is provided with the first quantity of output caches, wherein the storing the target output data comprises storing, by group, the target output data into at least one output cache of the first quantity of output caches, wherein the target network layer has a first operation parallelism degree indicating a quantity of operation functions comprised in the target network layer, wherein the group control unit groups the input tiles in the input data set into a plurality of input data groups, each input data group comprising successively arranged input tiles, a number of which is determined based on the first operation parallelism degree and the first quantity, and wherein the computing engine performs offset filling processing on operation functions in the target network layer according to an arrangement position of the target input tile in a target input data group to which the target input tile belongs, to obtain a target filling function group; and invokes functions in the target filling function group according to the concurrent instruction to perform parallel processing on the target input tile.

14. The method according to claim 13, wherein the parsing comprises parsing the processing instruction for the target network layer to obtain a migration instruction; and the method further comprises:

storing, by using a full storage unit of the artificial intelligence accelerator, the input data set of the target network layer and an output data set of the target network layer, the output data set comprising output data respectively corresponding to the plurality of input tiles; and performing, by using a migration engine of the artificial intelligence accelerator, a data migration operation between the full storage unit and the group cache unit according to the migration instruction.

15. The method according to claim 14, wherein the migration instruction comprises at least one of a load migration instruction or a store migration instruction; and the performing the data migration operation comprises:

receiving a load migration instruction from the control unit, and migrating an input tile in the full storage unit to the group cache unit according to the load migration instruction; and/or receiving a store migration instruction from the control unit, and migrating, according to the store migration instruction, output data cached in the group cache unit to the full storage unit.

16. The artificial intelligence accelerator according to claim 15, wherein the target network layer has a second operation parallelism degree indicating a processing data amount in the depth direction each time the target network layer performs parallel processing, the second operation parallelism degree being equal to the first quantity.

17. The artificial intelligence accelerator according to claim 16, wherein the first operation parallelism degree is greater than the first quantity, and the performing the parallel processing comprises grouping operation functions in the target network layer into P function groups, and successively invoking operation functions in each function group according to the concurrent instruction to perform parallel processing on the target input tile, P being determined according to a ratio of M to N, M representing the first operation parallelism degree and N representing the first quantity, M and N being positive integers.

18. The artificial intelligence accelerator according to claim 17, wherein the group cache unit comprises an input cache, and the target input tile independently uses one load migration instruction, one concurrent instruction, and one store migration instruction;

the performing the data migration operation comprises:

migrating the target input tile from the full storage unit to the input cache of the group cache unit according to a load migration instruction corresponding to the target input tile; and migrating the target output data in the corresponding one of the first quantity of output caches to the full storage unit according to a store migration instruction corresponding to the target input tile; and the performing the parallel processing comprises reading the target input tile from the input cache by using the group control unit, and performing parallel processing on the target input tile according to a concurrent instruction corresponding to the target input tile, to obtain the target output data corresponding to the target input tile.

19. An artificial intelligence acceleration device, comprising the artificial intelligence accelerator according to claim 1.

20. An artificial intelligence acceleration chip, packaged with the artificial intelligence accelerator according to claim 1.

* * * * *